US012087489B2

(12) United States Patent
Beddingfield et al.

(10) Patent No.: US 12,087,489 B2
(45) Date of Patent: Sep. 10, 2024

(54) TRANSFORMER DESIGNS FOR VERY HIGH ISOLATION WITH HIGH COUPLING

(71) Applicant: North Carolina State University, Raleigh, NC (US)

(72) Inventors: Richard Byron Beddingfield, Raleigh, NC (US); Subhashish Bhattacharya, Raleigh, NC (US); Tsz Sing Wong, Raleigh, NC (US); Paul Ohodnicki, Allison Park, PA (US)

(73) Assignees: NORTH CAROLINA STATE UNIVERSITY, Raleigh, NC (US); U.S. DEPARTMENT OF ENERGY, Washington, DC (US)

( * ) Notice: Subject to any disclaimer, the term of this patent is extended or adjusted under 35 U.S.C. 154(b) by 565 days.

(21) Appl. No.: 16/923,893

(22) Filed: Jul. 8, 2020

(65) Prior Publication Data

US 2021/0012944 A1 Jan. 14, 2021

Related U.S. Application Data

(60) Provisional application No. 62/871,606, filed on Jul. 8, 2019.

(51) Int. Cl.
*H01F 27/24* (2006.01)
*H01F 27/02* (2006.01)
*H01F 27/28* (2006.01)

(52) U.S. Cl.
CPC ............ *H01F 27/28* (2013.01); *H01F 27/02* (2013.01); *H01F 27/24* (2013.01)

(58) Field of Classification Search
CPC .......... H01F 27/28; H01F 27/02; H01F 27/24; H01F 3/14; H01F 27/263; H01F 27/2823; H01F 3/04; H01F 3/02; H01F 27/255
See application file for complete search history.

(56) References Cited

U.S. PATENT DOCUMENTS 4,238,753 A * 12/1980 Bayer .................. H01F 27/306 336/198
5,977,853 A * 11/1999 Ooi ...................... H01F 27/027 336/212
6,507,131 B1 * 1/2003 Malfroy .................. H01F 27/36 307/104
8,018,314 B2 * 9/2011 Zeng ......................... H01F 5/04 336/198

(Continued)

*Primary Examiner* — Mang Tin Bik Lian
(74) *Attorney, Agent, or Firm* — Thomas | Horstemeyer, LLP

(57) ABSTRACT

Various examples are provided related to transformer designs that offer very high isolation while maintaining high coupling between the windings. In one example, an isolation transformer includes a first excitation coil wound around a first core and a second excitation coil wound about a second core. The second core is electrically separated from the first core by a high resistivity magnetic material or a non-conductive material. The first and second cores can include corresponding core segments arranged in a trident geometry or a quindent geometry. The core segments can align when the first excitation coil is inserted into a void of the second excitation coil. The isolation transformer designs are mechanically separable which can result in safe, energized, plug operations.

17 Claims, 21 Drawing Sheets

Trident Type 1

(56) References Cited

U.S. PATENT DOCUMENTS

| | | | | |
|---|---|---|---|---|
| 8,698,586 | B2 * | 4/2014 | Park | H05B 41/02 336/192 |
| 8,786,391 | B2 * | 7/2014 | Nobusaka | H01F 3/14 336/212 |
| 9,514,875 | B2 * | 12/2016 | Worek | H01F 27/38 |
| 2002/0011914 | A1 * | 1/2002 | Ikeura | H01F 27/325 336/208 |
| 2002/0175798 | A1 * | 11/2002 | Sigl | H01F 38/085 336/198 |
| 2006/0125593 | A1 * | 6/2006 | Piaskowski | H01F 41/0213 336/229 |
| 2010/0231343 | A1 * | 9/2010 | Zeng | H01F 27/325 336/192 |
| 2012/0206232 | A1 * | 8/2012 | Yamamoto | H01F 3/14 336/210 |
| 2014/0354386 | A1 * | 12/2014 | Adar | H01F 1/15333 29/605 |
| 2015/0061808 | A1 * | 3/2015 | Iwakura | H01F 27/346 336/178 |
| 2015/0364240 | A1 * | 12/2015 | Demersseman | H01F 27/255 336/178 |
| 2016/0329148 | A1 * | 11/2016 | Iwakura | H01F 27/24 |
| 2020/0027651 | A1 * | 1/2020 | Chen | H01F 27/24 |

* cited by examiner

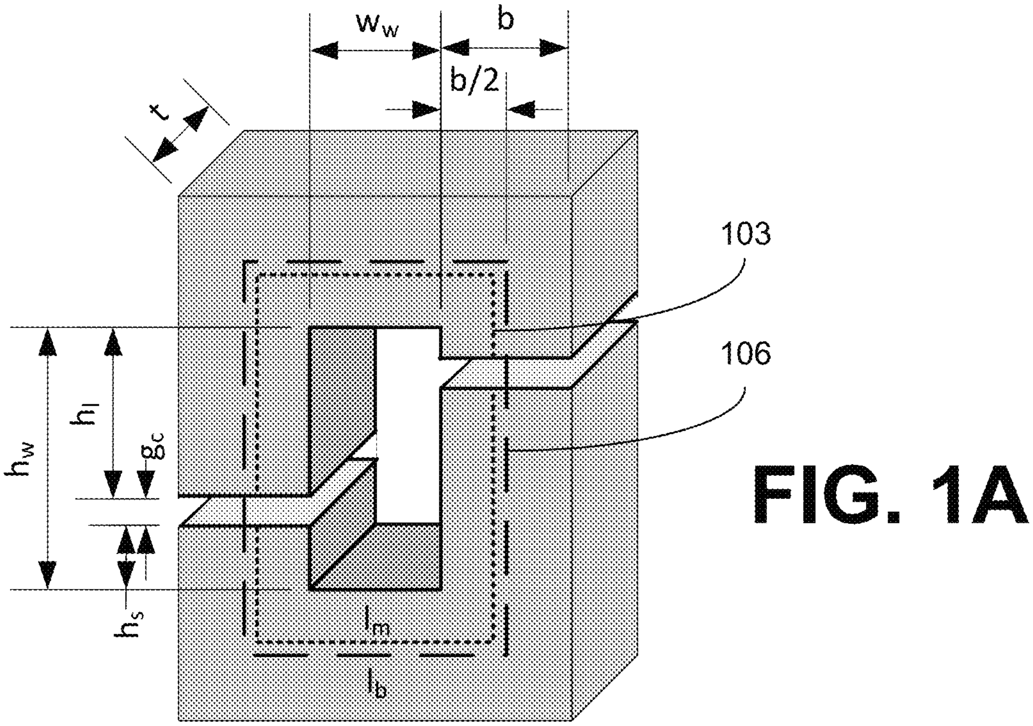
FIG. 1A
FIG. 1B
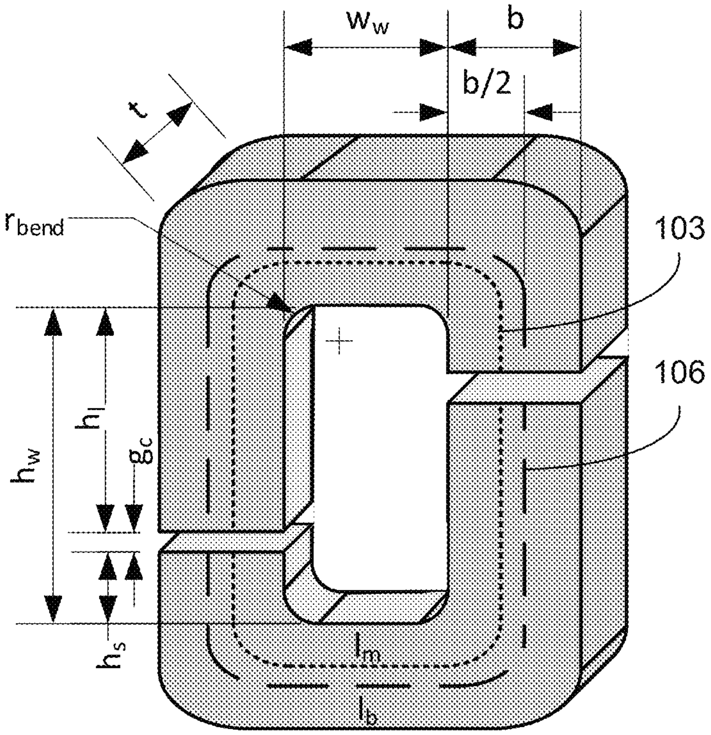

Quindent Type 3

Quindent Type 4

TRANSFORMER DESIGNS FOR VERY HIGH ISOLATION WITH HIGH COUPLING

CROSS REFERENCE TO RELATED APPLICATIONS

This application claims priority to, and the benefit of, U.S. provisional application entitled "Transformer Designs for Very High Isolation with High Coupling" having Ser. No. 62/871,606, filed Jul. 8, 2019, which is hereby incorporated by reference in its entirety.

STATEMENT REGARDING FEDERALLY SPONSORED RESEARCH OR DEVELOPMENT

The present invention was made with United States Government support under Grant No. DE-AR0000896 awarded by the U.S. Department of Energy/Advanced Research Projects Agency-Energy (DOE/ARPA-E). The United States Government has certain rights in the invention.

BACKGROUND

High frequency transformers area critical part of wide bandgap (WBG) based power converters. As the WBG devices mature and gain greater high voltage capabilities, the converters are asked to perform with higher voltage ratings. In order to meet strict safety and isolation requirements, the HF transformer is required to have greater ability to provide this isolation.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 1A and 1B illustrate examples of rectangular core geometries, in accordance with various embodiments of the present disclosure.

DETAILED DESCRIPTION

Figure 2A:
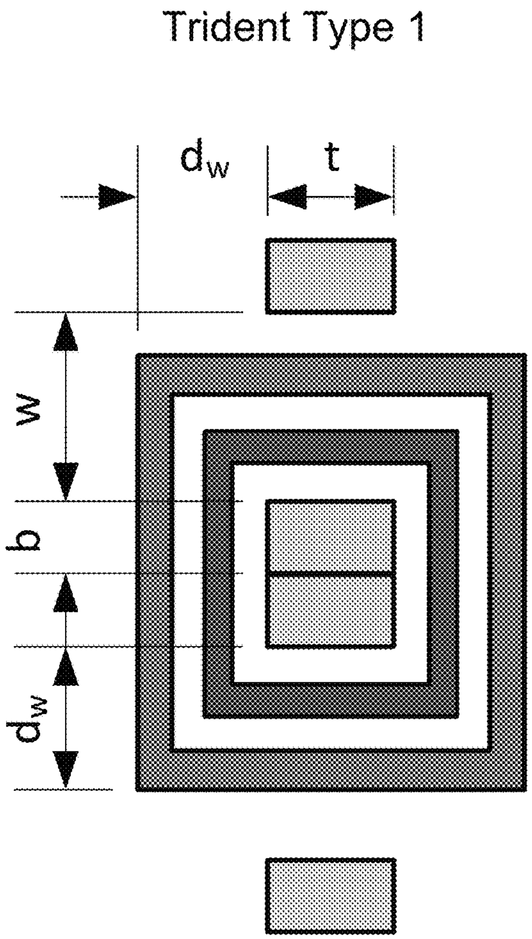
FIGS. 2A-2F are cross-sectional views of trident and quindent core geometries, in accordance with various embodiments of the present disclosure.

Disclosed herein are various examples related to transformer designs that offer very high isolation while maintaining high coupling between the windings. This isolation can be achieved by increasing the space between windings as well as separating the magnetic core into high and low voltage sides with a physical separation. The transformer winding and core geometries are illustrated in this disclosure, including examples of fabricated isolation transformers. A key potential of these designs is a plug action. Because the magnetic core is cut and separated with a barrier, these designs make a natural magnetic plug that is entirely arc free despite high voltage ratios. This enables these designs to be intrinsically safe.

The disclosed transformer geometries enable very high voltage isolation for high frequency power electronics-based converters while maintaining high coupling factors. This expands the various opportunities for these types of converters to different voltage levels as well as reducing the number of stages for reducing high voltage. Unlike traditional wireless power transformer designs, the disclosed isolation transformers do not need any resonant circuits which constitute additional losses in traditional designs. Another advantage as that there is never an electrical disconnect. This means that the di/dt will never be high, causing a sudden rise in voltage which could lead to an arc. Rather, these plug types only change the dB/dt or the magnetic field.

Reference will now be made in detail to the description of the embodiments as illustrated in the drawings, wherein like reference numbers indicate like parts throughout the several views. Isolation transformers with split-core magnetics and separable primary and secondary cores will be discussed. The design of isolation transformer configurations using three limb (trident) and five limb (quindent) core geometries are presented. The designs use several analytical expressions for parasitic effects that rely on the impact that different core geometries provide. The windings can be concentrically wound with the primary winding interior to the secondary winding. An isolation barrier can be provided between the windings. Isolation can also be provided between magnetic bars of the cores. Nanocrystalline materials can be used to guide the flux. The designs can be optimized to maximize coupling and efficiency of the unit.

Core Geometry

Core area. For a given isolation transformer design, the needed core area depends on the terminal voltage and winding turns. For the secondary side, this is $V_s$ and $N_s$ respectively. The cross-sectional area of the secondary core can be expressed as:

$$A_c = \frac{V_S}{kN_s B_{pk} f} \tag{1}$$

Given the high current of the secondary, it is desirable to use a minimal number of turns that also maintains proper core coupling (e.g., 2 turns may be chosen). The core area also depends on the voltage excitation pattern, sinus or square, with a scalar, k, for example:

$$k_{sin} = \frac{2\pi}{\sqrt{2}} \text{ and } k_{sq} = 4,$$

and the voltage frequency, f. These parameters are chosen by the converter design. Finally, the allowed peak flux density, $B_{pk}$, also determines the design area. With the other free variables constrained by either the circuit or the system rating, the transformer design optimization may be derived from a sweep of the peak flux density alone as long as the peak is below the material saturation flux density.

Core magnetic length path and window dimensions. There are two path lengths associated with a core. The generally known mean magnetic length path, $l_m$, which is the mean path of magnetic flux, and the build path, $l_b$, which is an imaginary path that the cross-sectional area sweeps for the 3D build of the core. FIGS. 1A and 1B show examples of separable cores geometries. As shown in FIGS. 1A and 1B respectively, the core geometries can include rectangular builds, as is common in ferrite, or racetrack builds where there is a minimum bend radius, $r_{bend}$, as is the case with tape wound cores. The two length paths are illustrated in FIGS. 1A and 1B by dashed and dotted lines, $l_m$ (103), and $l_b$ (106). The build path follows a centerline around the window that is offset by half the build dimension. For the rectangular core of FIG. 1A, the magnetic and build paths can be given by:

$$l_m = \frac{8b}{\ln\left(\frac{h_w + w_w + 4b}{h_w + w_w}\right)}, \tag{2a}$$

$$l_b = 2(h_w + g_c + w_w + 2b), \tag{2b}$$

where $h_w$ and $w_w$ are the window height and window width of the core, $g_c$ is the gap length between core segments, and b is the width the core. For the rectangular core of FIG. 1A, the magnetic and build paths can be given by:

$$l_m = \frac{2\pi b}{\ln\left(\frac{r_{bend} + b}{r_{bend}}\right)} + 2(h_w + w_w), \tag{2c}$$

$$l_b = 2\left(h_w + g_c + w_w + \pi\left(r_{bend} + \frac{b}{2}\right)\right). \tag{2d}$$

where the dimensions depend primarily on the width and height of the primary and secondary windings, $p_w$, $p_h$, $s_w$, and $s_h$ respectively. The total thickness of the bobbin and insulating materials on the primary and secondary cores, $t_b$, increases the width. Finally, the desired winding gap length, $g_w$, between the primary and secondary windings can be chosen to maintain proper voltage clearance and insulation between the windings as well as tuning of the winding to winding parasitic capacitance. The window height is the sum of the long and short core limbs, $h_l$ and $h_s$ respectively, and the core gap, $g_c$. It is bound by the height of the windings and insulation. This depends on the total vertical bobbin height, $h_b$. It also must accommodate the tallest of the primary and secondary winding heights, $p_h$ and $s_h$ respectively.

Core perimeter. Given the cross-sectional area, Eqn. (1), two transformer geometry candidates, the trident and the quindent, were considered which have three and five limbs respectively. If metal amorphous nanocomposite (MANC) materials are used, there are discrete ribbon widths that are generally in stock. The individual cores would then be rectangles with a thickness, t, corresponding to the ribbon width and a build thickness, b, that gives the core area of:

$$b = \frac{A_c}{FF_c t},$$

where $FF_c$ is the conductor fill factor. The displaced area of the ribbon stack is $A_{disp}$=bt.

Given that b≅t, there are two meaningful core arrangements for the trident geometries that can provide a minimal perimeter for a minimized mean length turn (MTL). The quindent also has two minimal MLT arrangements provided the build and thickness constraints are met. Two alternate arrangements may also provide a local minimal MLT given discrete ribbon thickness constraints.

FIGS. 2A-2F are cross-sectional views illustrating the core arrangements for the two trident geometries and the four quindent geometries. Table 1 below provides the perimeters for each core configuration. If ferrite cores are used, the ratio of b to t is definable in the core design, b=at. Therefore, the values should be chosen in conjunction with a geometry to result in a square center cross-sectional area.

TABLE 1

| Core Layout | Perimeter | Condition | Rectangular | Minimum |
|---|---|---|---|---|
| Trident Type 1 | 2t + 4b = 2t(1 + 2a) | none | (1 + 2a)/(2sqrt(2a)) | a < 1, never |
| Trident Type 2 | 4t + 2b = 2t(2 + a) | none | (2 + a)/(2sqrt(2a)) | a > 1, never |
| Quindent Type 1 | 8t = 8t | b < t | 1/sqrt(a) | a > 1, b > t |
| Quindent Type 2 | 8b = 8at | b > t | sqrt(a) | a < 1, never |
| Quindent Type 3 | 4(t + b) = 4t(1 + a) | none | (1 + a)/2sqrt(a) | a < 1, 0.5t < b < t |
| Quindent Type 4 | 8b + 2t = 2t(4a + 1) | (b < t) | (4a + 1)/4sqrt(a) | a < ½, b < 0.5t |
| | 4(t + b) = 4t(a + 1) | (b > t) | (a + 1)/2sqrt(a) | a < 1, never |

The mean magnetic path, $l_m$, is related to the magnetizing inductance as it is proportional to the core reluctance. The build path, $l_b$, is useful for determining the core volume which will be used in the core loss calculation.

The window width and height of the window can be expressed as:

$$w_w = t_b + g_w + w_p + w_s, \tag{3a}$$

$$h_w = h_b + \max(p_h, s_h) + h_l + g_c + h_s, \tag{3b}$$

Given that the transformer window is of width, $w=w_w$, and height, $h=h_w$, the box and displacement volume can be described below. The box volume is the volume of a box that just touches the longest component of the transformer in three dimensions while the displacement volume is a tighter measurement that treats the cores and windings as a summation of boxes. Assume that the winding fills the window and extends some dimension, $d_w$, from the core dimension, $d_c$, as given by:

$$d_w = t_{pri} + g_w + t_{sec} + i_{sec}, \tag{4}$$

where $t_{pri}$ and $t_{sec}$ are the thickness of the primary and secondary windings, $g_w$ is the winding gap between the primary and secondary windings, and $i_{sec}$ is the secondary insulation thickness. Table 2 illustrates the box and displacement volumes for the different core layouts.

TABLE 2

| Core Layout | Box Volume | Displacement Volume |
|---|---|---|
| Trident Type 1 | $h2t(t + 2d_w)(4b + 2w)$ | $t(2b + w)h2t + 4d_w(b + d_w)h_w$ |
| Trident Type 2 | $h4t(t + d_w)(3b + 2w)$ | $t(2b + w)h2t + 2d_w(b + 2d_w + t)h_w$ |
| Quindent Type 1 | $h2t(4b + 2w)^2$ | $4(t^2 + t(b + w))h2t+)+4d_w(d_w + t)h_w$ |
| Quindent Type 2 | $h2t(4b + 2w)^2$ | $4(b^2 + t(b + w))h2t + 4d_w(2b + d_w - t)hw$ |
| Quindent Type 3 | $h2t(2b + 2w + t)^2$ | $(b + t)^2 + 4t(w + b)h2t + 4d_w(b + d_w)hw$ |
| Quindent Type 4 | $h2t(4b + 2w + t)(4b + 2w)$ | $(2b(2b + t) + 4t(w + b))h2t + 4d_w(3b + d_w - t)hw$ |

Winding Design

The winding design and configuration for the isolation transformers is motivated by maximizing the coupling, minimizing required volume while also supporting the high voltage ratio and current of the secondary. A good design choice for the primary winding can be wound with a solid magnetic wire or litz type wire. These enable multiple compact turns. To support high current, the secondary winding can be wound with a copper foil. In some embodiments, an aluminum foil can be used. The details of the design selection for the windings will now be discussed.

Primary conductor. The primary winding can be assembled with litz wire or magnet wire. With the many turns of the primary winding, a vertical stack assembly will minimize the horizontal expansion. Minimizing the horizontal expansion reduces the overall volume and can lead to lower leakage inductance. This is particularly poignant with multiple turns as the air space between windings, and in the litz case, between strands contributes to the leakage flux paths. These leakage flux paths increase the total leakage flux, reducing the transformer coupling. The area needed for the primary conductor can be determined based upon the rated power (P) and primary voltage ($V_p$). It can be scaled by a chosen primary current density ($J_p$) and primary conductor fill factor ($FF_p$). Litz wire has a low fill factor generally around 0.6 but lower in some builds. The area of the primary conductor can be determined using:

$$A_{p\text{-}req} = \frac{I_p}{J_p} = \frac{P}{V_p J_p}, \tag{5a}$$

$$A_p = \frac{A_{p\text{-}req}}{FF_p} = \frac{P}{V_p J_p FF_p}, \tag{5b}$$

where $I_p=P/V_p$.

The limit for a solid conductor can be given by:

$$\delta = \sqrt{\frac{1}{\pi f \mu \sigma}}, \tag{6a}$$

$$r_P = \sqrt{\frac{P}{\pi V_p J_p}} \leq \sqrt{\frac{1}{\pi f \mu_w \sigma}}, \tag{6b}$$

$$f \leq \frac{V_p J_p}{P \mu_w \sigma}, \tag{6c}$$

with $\mu=4\pi\times10^{-7}$; $\sigma_{al}=3.5\times10^7$; $\sigma_{cu}=5.96\times10^7$; $\sigma_{cu\text{-}an}=5.96\times10^7$, or with slightly higher AC resistance, $R_{ac}$:

$$r_p \leq 2\sqrt{\frac{1}{\pi f \mu_w \sigma}}, \tag{6d}$$

-continued $$f \leq \frac{4V_p J_p}{P \mu_w \sigma}. \tag{6e}$$

The primary winding geometry (height and width) can be given as:

$$p_h = \left\lceil \frac{N_p}{n_p} \right\rceil (p_D + 2Ins_p), \tag{7a}$$

$$p_w = n_p(p_D + 2Ins_p). \tag{7b}$$

for a total number of primary turns ($N_p$) in $n_p$ concentric columns, primary conductor diameter ($p_D$), and primary insulation thickness ($Ins_p$).

Secondary conductor. The area of the secondary winding can be similarly determined. It can be scaled by a chosen secondary current density ($J_s$) using:

$$A_{s\text{-}req} = \frac{I_s}{J_s}, \tag{8}$$

where $I_s=P/V_s$. The foil turn geometry (secondary conductor (foil) width and number of secondary turns) can be defined as:

$$s_w = 2\delta = 2\sqrt{\frac{1}{\pi f \mu_w \sigma}}, \tag{9a}$$

$$n_s = \left\lceil \frac{A_{s\text{-}req}}{s_h s_w} \right\rceil. \tag{9b}$$

where the secondary conductor height $s_h \geq p_h$, which may be arbitrarily chosen within this constraint, and the secondary winding geometry width can be given as:

$$w_s=n_s N_s+(2n_s-1)\mathrm{Ins}_s. \tag{10}$$

There are a total number of secondary turns ($N_s$) in $n_s$ concentric columns, with a secondary insulation thickness ($Ins_s$).

3D rendering. For clarity, three-dimensional (3D) renderings of the quindent core geometries are provided. FIGS. 3A-3D illustrate the quindent type 1 arrangement of FIG.

Figure 3A:
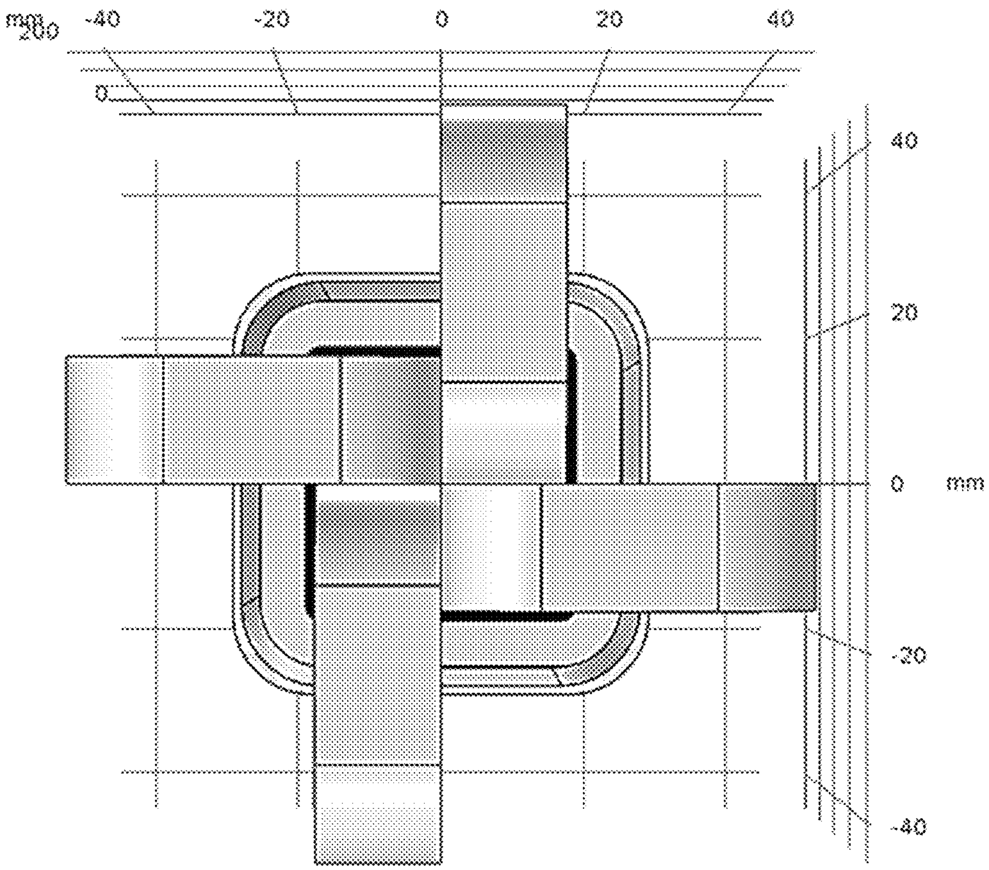
FIGS. 3A-3D, 4A-4D and 5A-5D illustrate 3D examples of quindent core geometries, in accordance with various embodiments of the present disclosure.
Figure 3B:
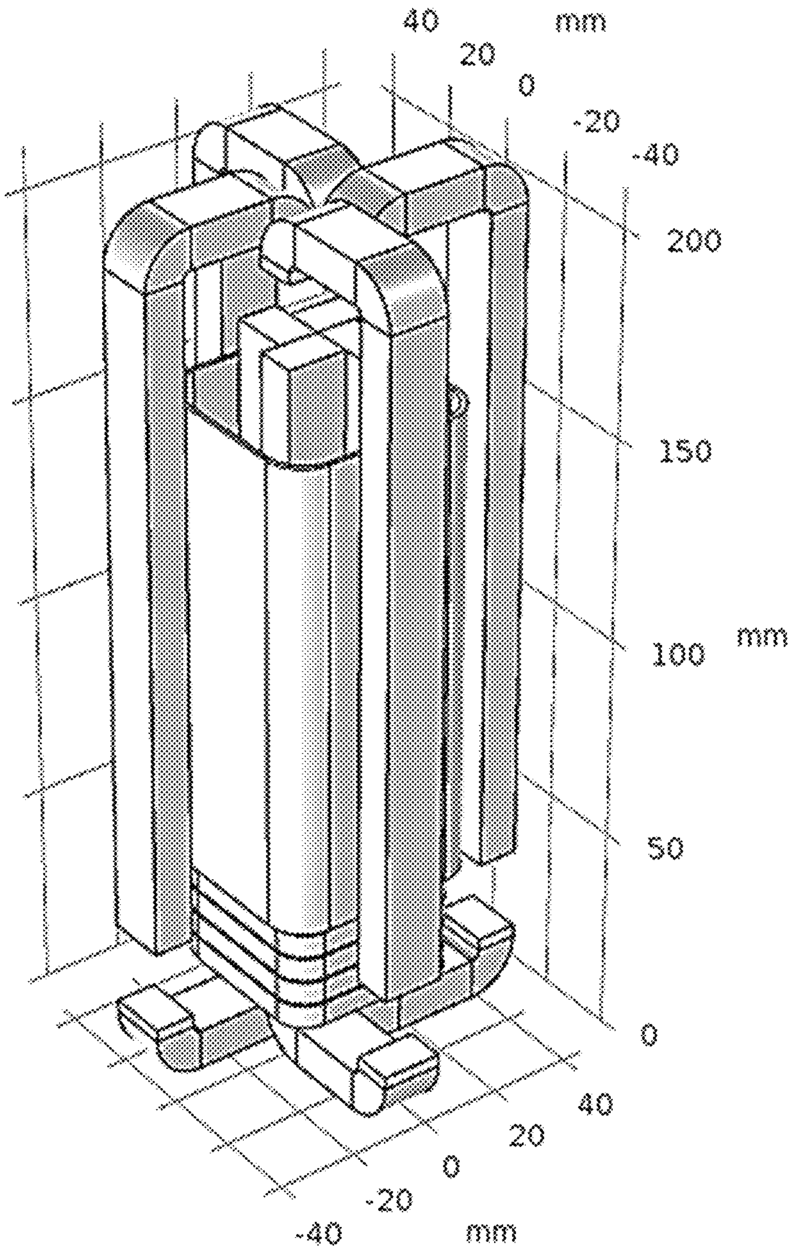
Figure 3C:
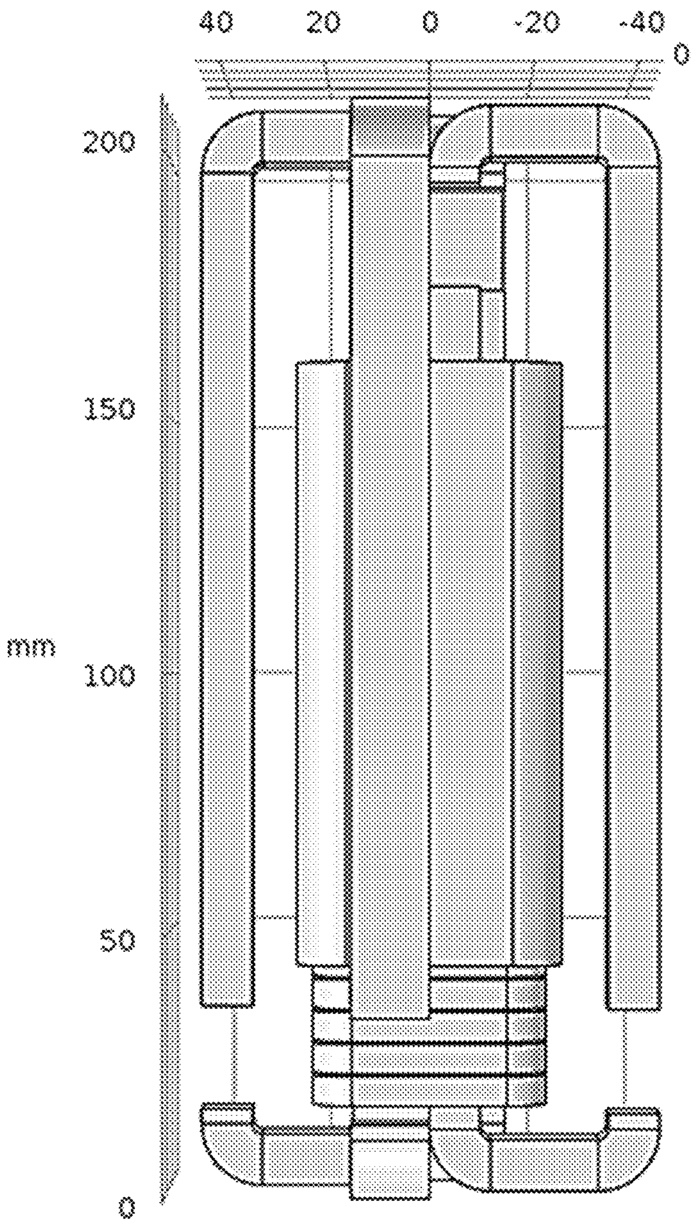
Figure 3D:
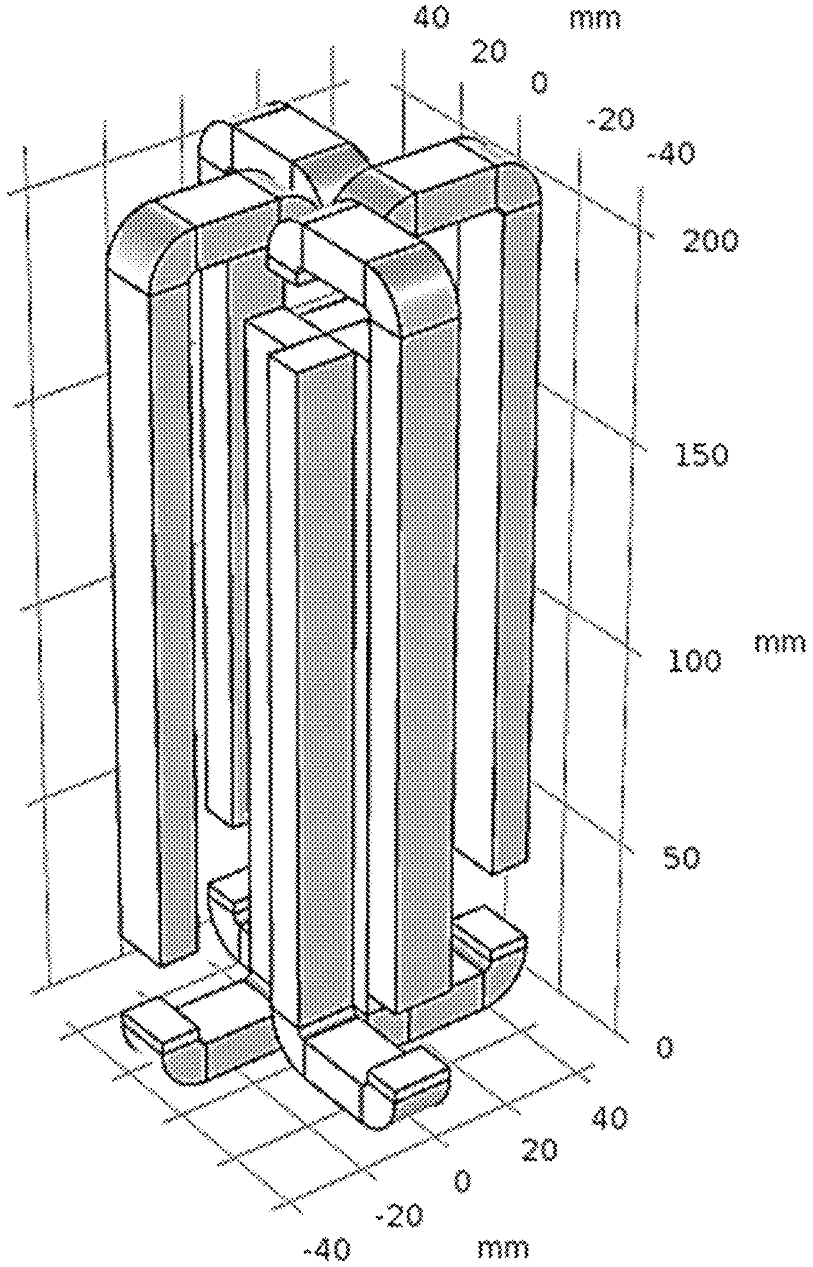
Figure 4A:
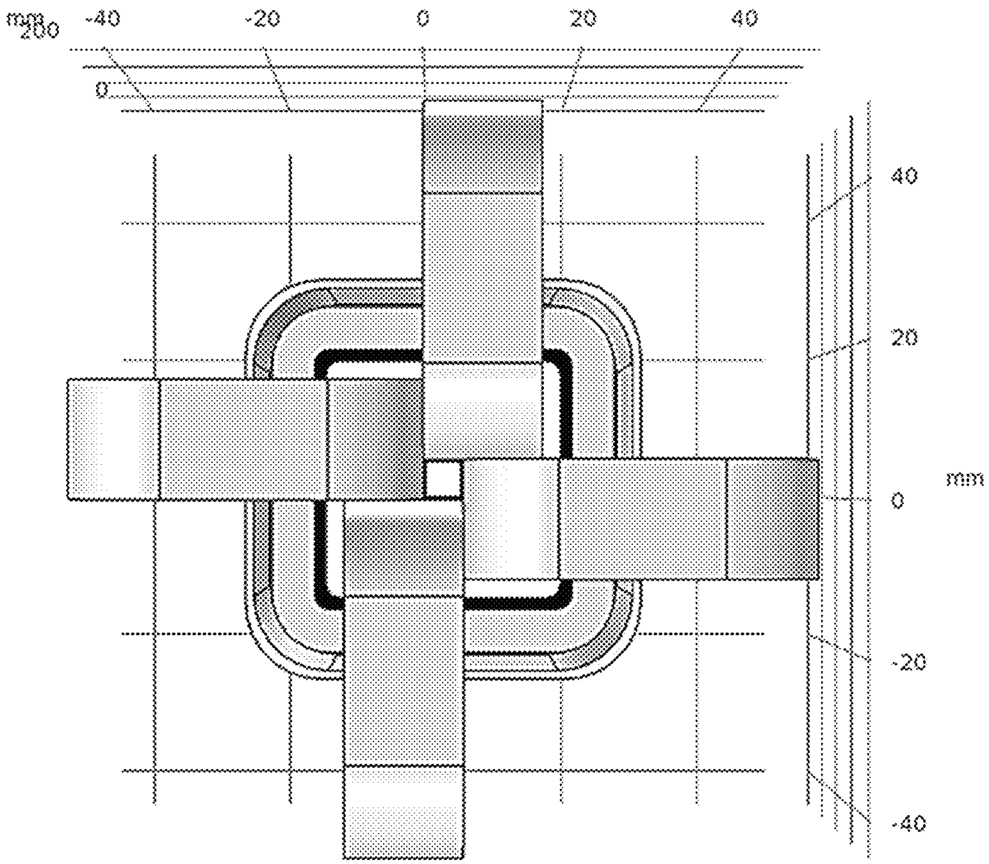
Figure 4B:
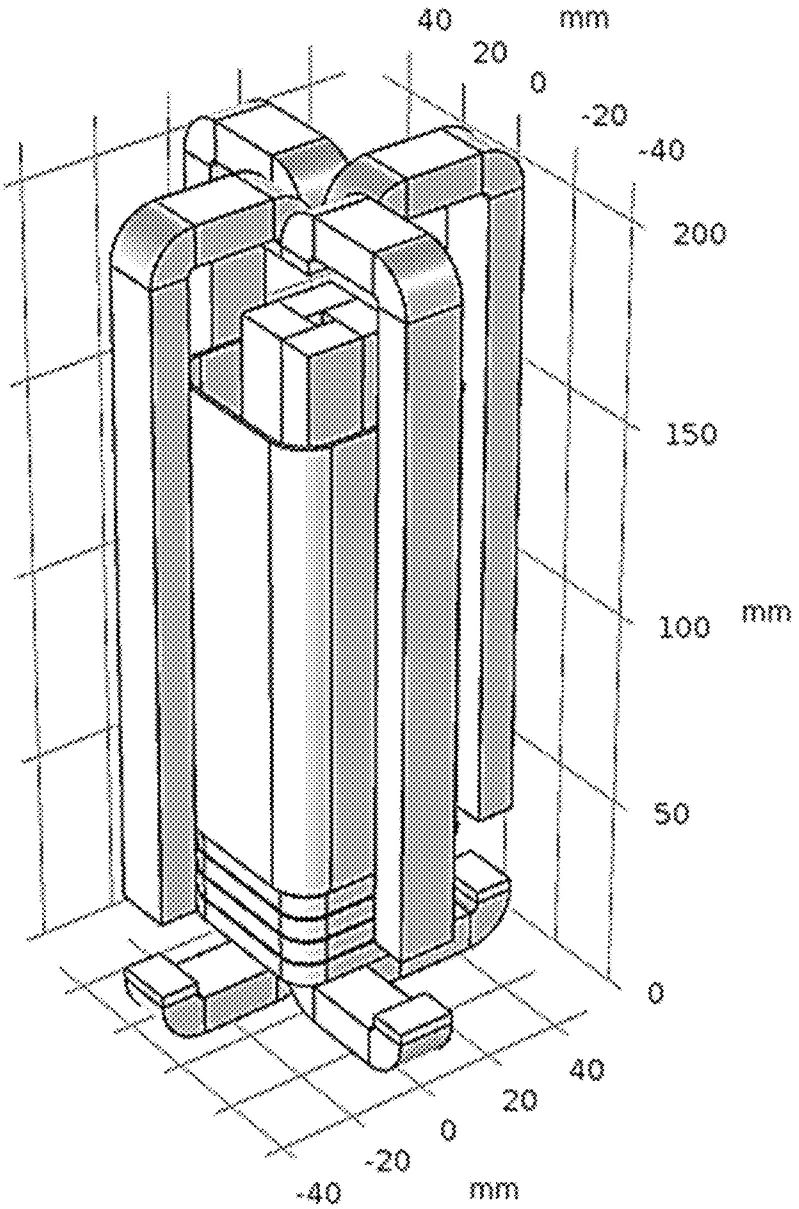
Figure 4C:
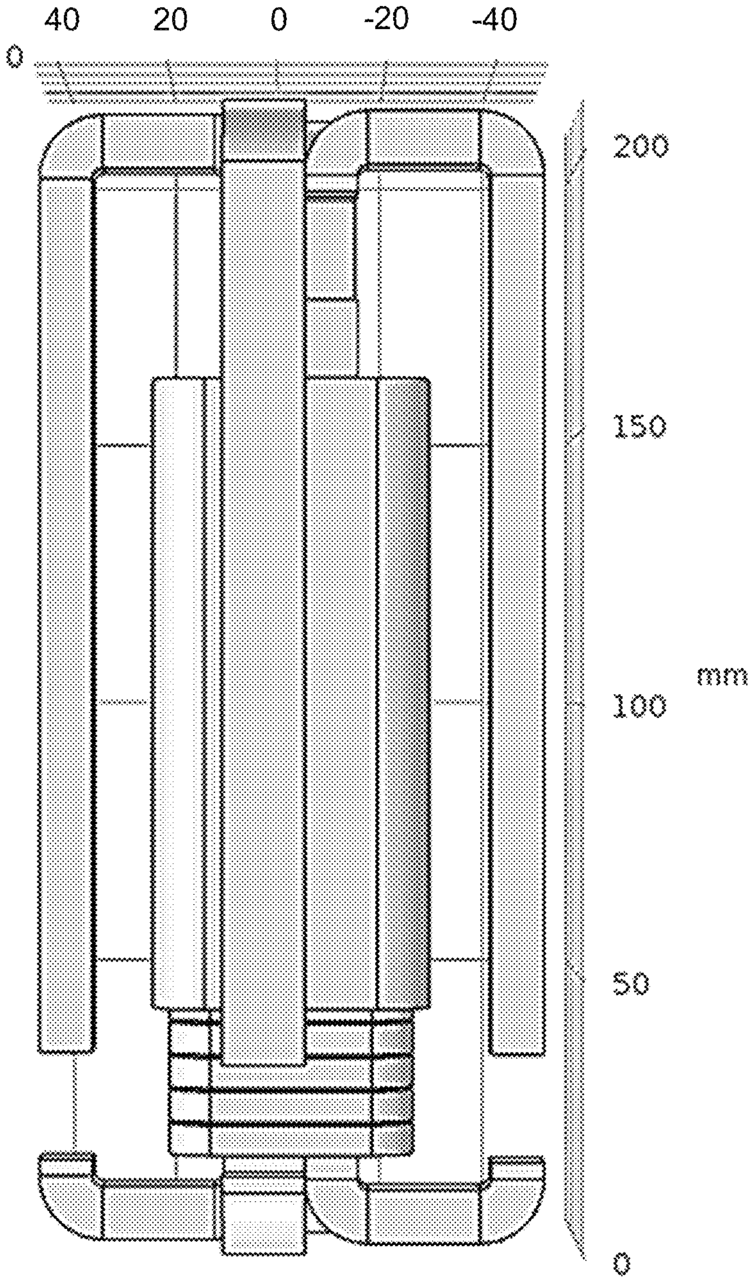
Figure 4D:
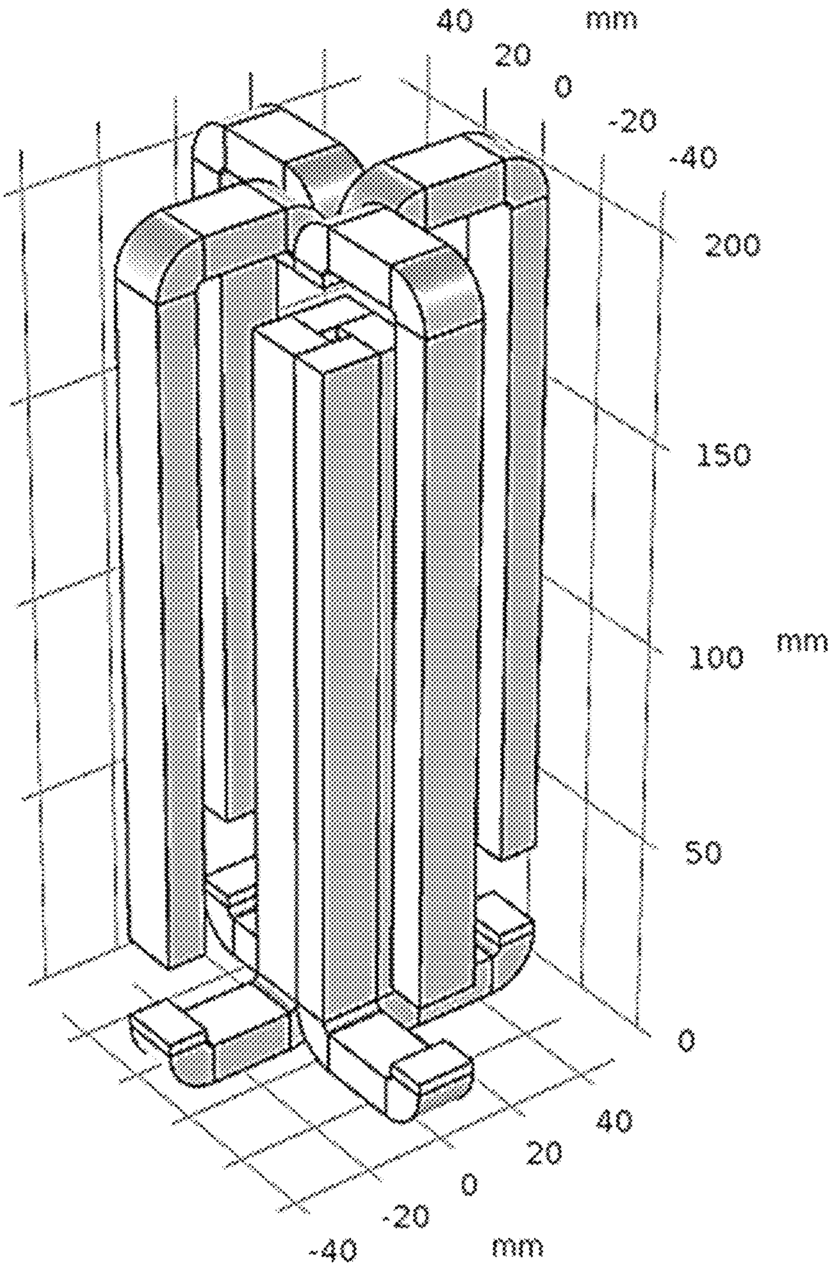
Figure 5A:
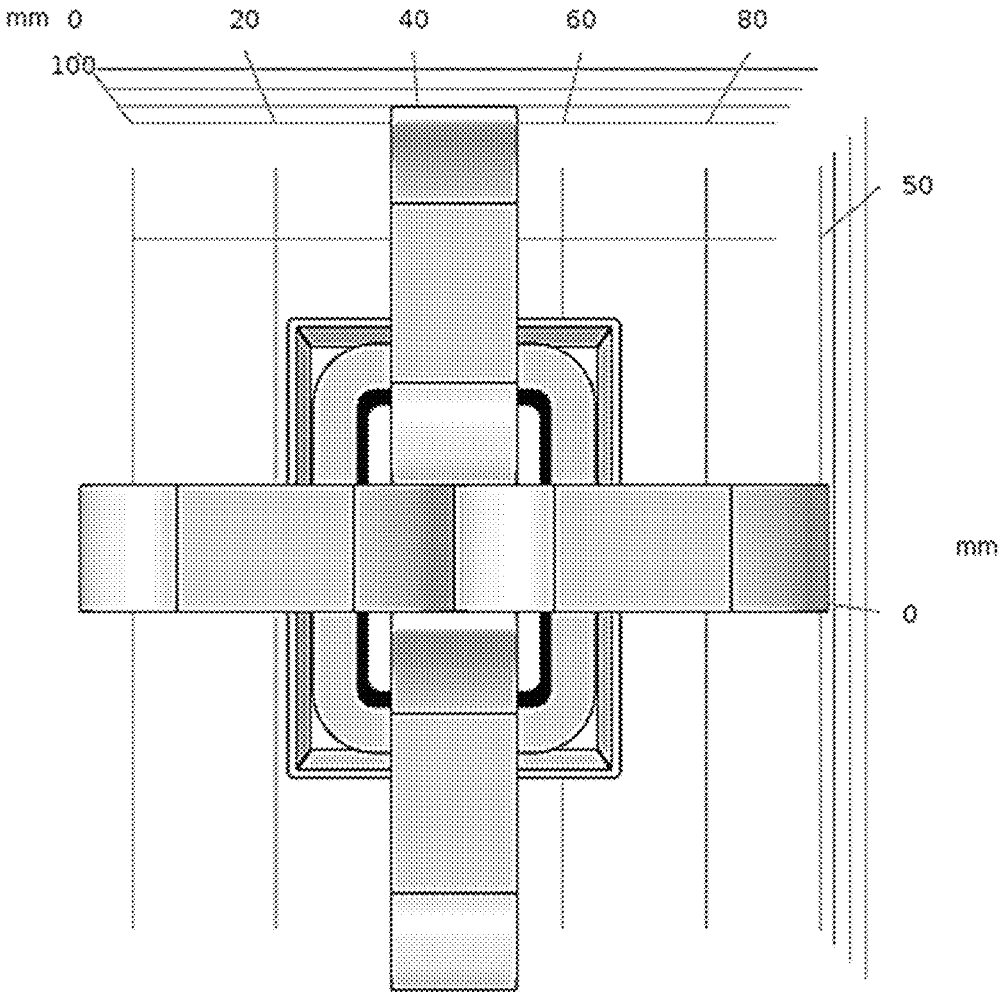
Figure 5B:
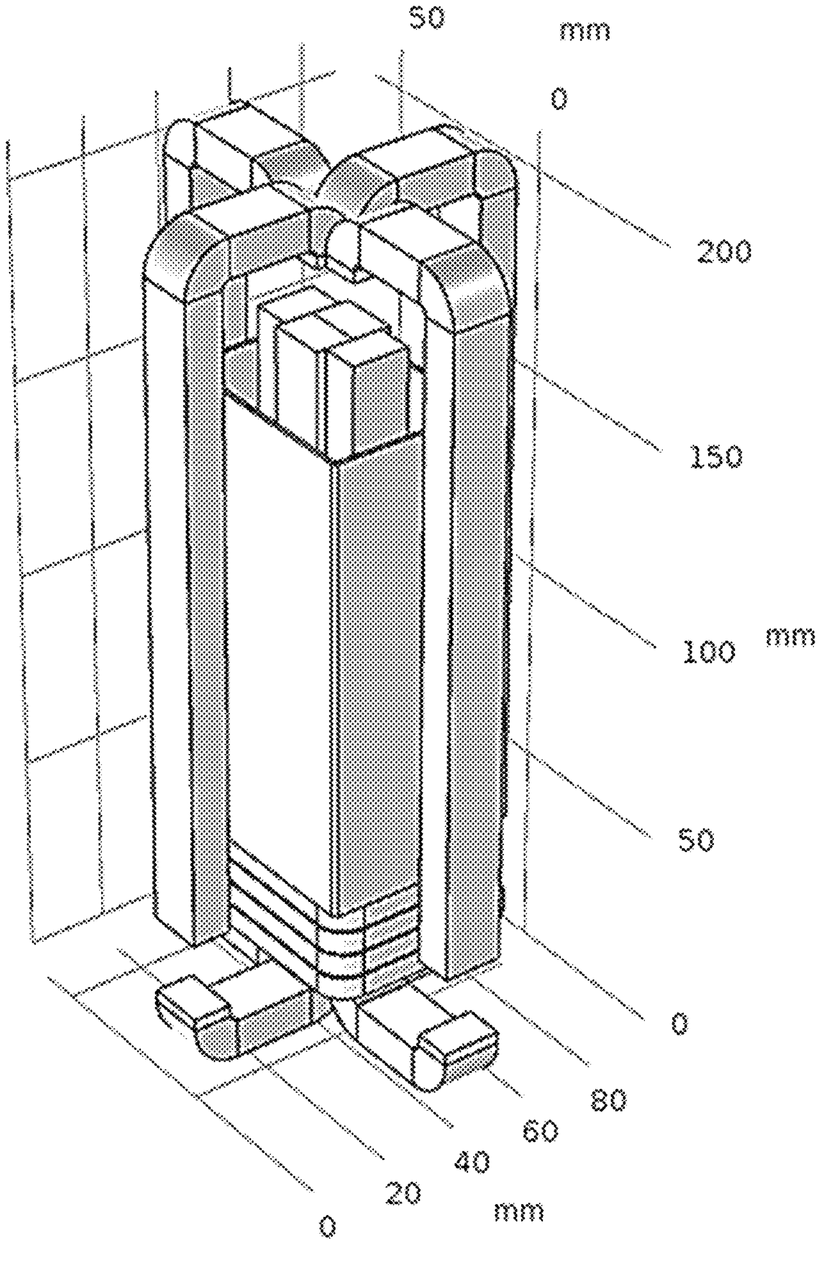
Figure 5C:
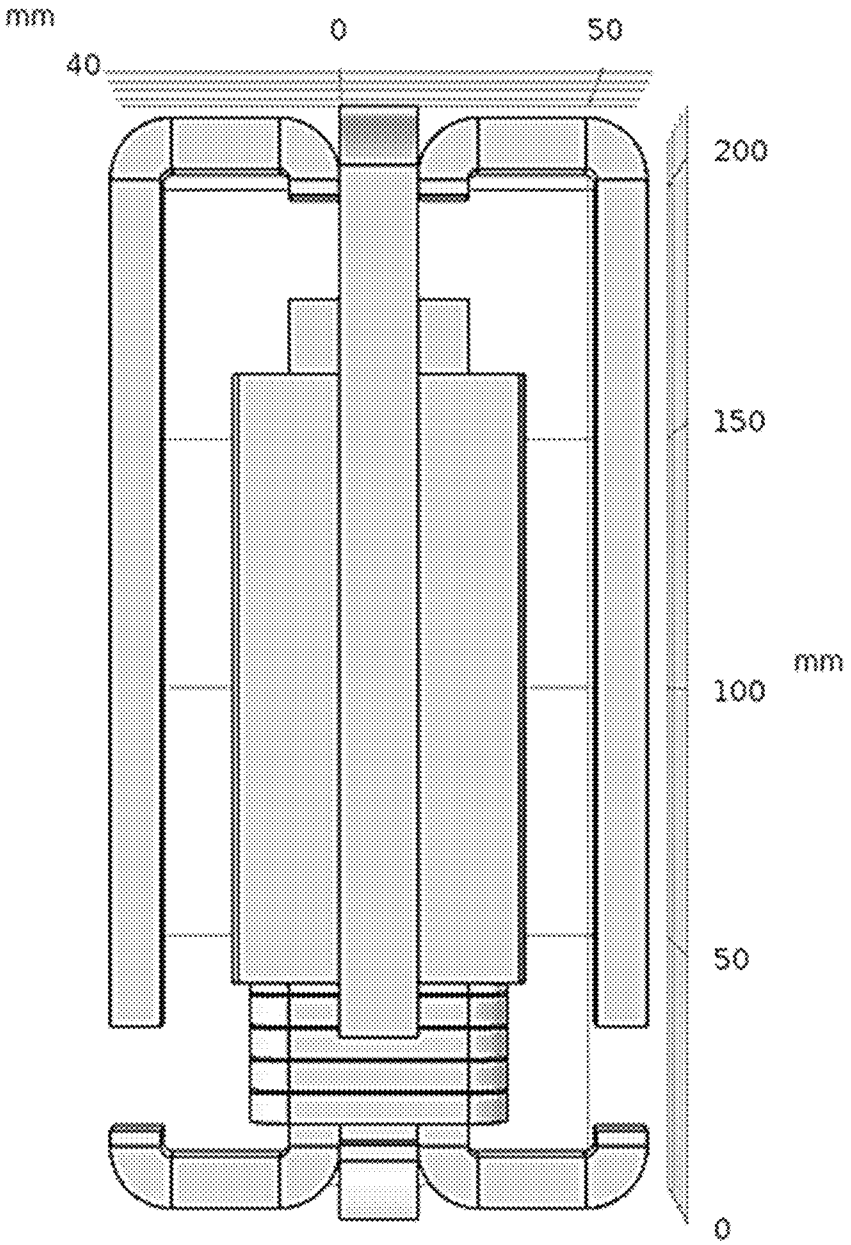
Figure 5D:
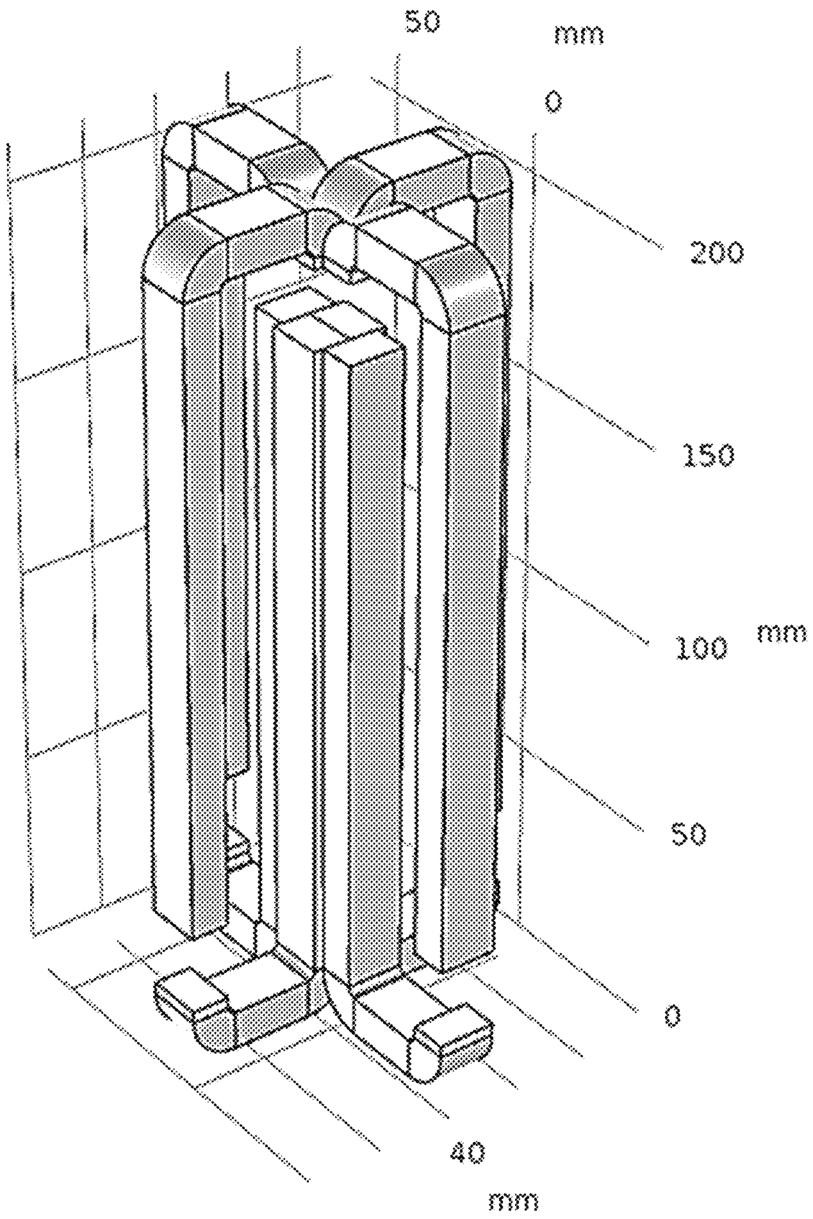

3C, FIGS. 4A-4D illustrate the quindent type 3 arrangement of FIG. 3E, and FIGS. 5A-5D illustrate the quindent type 4 arrangement of FIG. 3F. FIG. 3A is a top view showing the internal section of the core surrounded by insulation and a winding. The external section of the core aligns with the segments of the internal section of the core and extends over the winding and along the outside of the winding to align with the opposite ends of the segments of the internal section of the core as can be seen in the perspective and side views of FIGS. 3B and 3C. FIG. 3D is a perspective view of the transformer core without the insulation and winding shown. The quindent type 2 arrangement of the internal and external sections of the core is similar.

Encapsulating the primary winding. While the core gap provides separation between medium and low voltage sides, the winding can be encapsulated to ensure that the electric field between the primary winding and the core is maintained below the breakdown of air, 3 kV/mm. While encapsulant material can be used to fill the entire space between the winding and core, this leaves no room for cooling. Therefore, design of the spacing between the winding and core as well as the encapsulant thickness can be considered to ensure that appropriate electric field limits are met. The thickness of the encapsulant, $t_e$, can be estimated by using the boundary conditions for the electric field, $E_{air}$ at the boundary between air and the encapsulant. The encapsulant has a dielectric constant $k_e$ and the distance between the winding and the core is $l_p$. The tuning performed on the encapsulant can also consider the field stress that the barrier must support and may be asymmetric in the gap. A high detail 2D FEA that was derived from the parametric optimization and 3D FEA was used explore this issue. The gap length and gap material can be designed for the worst case, negative voltage.

$$t_e = \frac{V_{AC\text{-}pk} - E_{air} l_p}{E_{air}\left(\frac{1}{k_e - 1}\right)}$$

Transformer Losses

The total transformer losses comprise both core loss ($P_c$) and primary and secondary copper losses ($P_{cu\text{-}pri}$ and $P_{cu\text{-}sec}$). These losses are highly dependent on the geometric design where the core loss is proportional to the core volume and the winding losses depend on the perimeter of the center post of the transformer. The total losses can be defined as:

$$P_{Total} = P_c + P_{cu\text{-}pri} + P_{cu\text{-}sec}. \quad (11)$$

Table 3 provides an example of design parameters for an isolation transformer as described.

TABLE 3

| Parameter | Value |
|---|---|
| Power | 20000 W |
| Primary Voltage | 500 V |
| Secondary Voltage | 50 V |
| Fundamental Frequency | 36000 Hz |
| Primary Turns | 20 |
| Secondary Turns | 2 |
| Primary Current Density | 4 A/mm$^2$ |
| Secondary Current Density | 4 A/mm$^2$ |
| Bobbin Thickness | 2 mm |
| Additional Window Height | 5 mm |

TABLE 3-continued

| Parameter | Value |
|---|---|
| Core Gap | 0.5 mm |
| Winding Gap | 8 mm |
| Derived Window Perimeter | |

Magnetic core loss. The magnetic core loss varies based on the total core volume and the peak flux density. The core loss also depends on the flux frequency and excitation shape, yet these parameters are static and defined by the converter requirements. The traditional Steinmetz equation expresses the core loss using the core volume, $V_c$, excitation frequency, f, and peak flux density $B_{pk}$, and material specific loss k, α and β as:

$$P_c = V_c k f^{\alpha} B_{pk}^{\beta}. \quad (12)$$

Table 4 provides examples of the material dependent parameters used to determine the magnetic core loss.

TABLE 4

| Material ID | $\mu_r$ | $B_{max}$ (T) | $B_{sat}$ (T) | K | a | b |
|---|---|---|---|---|---|---|
| Finemet UnCut-Core FT-3TL | 20,000 | 1 | 1.23 | 9.62E−07 | 1.743 | 2 |
| Ferrox-Cube-3f35 | 2,400 | 0.2 | 0.5 | 1.42E−11 | 2.762 | 2.77 |
| Ferrox-Cube-3C95 | 5,000 | 0.2 | 0.53 | 2.02E−07 | 2.079 | 2.76 |
| Magnetics R | 4,300 | 0.25 | 0.5 | 4.31E−05 | 1.651 | 2.8 |

Conductor copper loss. The copper loss also depends on the core geometry in that the winding mean length turn starts from the core perimeter and is increased by various offsets for insulation structures, bobbins, and other physical constraints. In this design approach, using a specified current density, J, allows the copper loss for either the primary or secondary windings to be rearranged using only rated parameters as given below.

$$P_{cu\text{-}\{p/s\}} = \frac{P}{V_{\{p/s\}}} J_{\{p/s\}} \frac{MLT_{\{p/s\}} N_{\{p/s\}}}{\sigma_{\{p/s\}}}. \quad (13)$$

It is important to note that the coil designs can be geometrically optimized. That is, the primary coil can be a single column of turns while the secondary coil can be a single row of turns. For example, the primary can be assembled with appropriate Litz type wire and the secondary can be a foil-based conductor. In order to support the specified current, the secondary foil can be made of insulated laminations of foil that are less than two skin depths to minimize the AC resistance.

Transformer Design Pareto Front

With the volume and the loss determined from above, optimized designs can be found as part of a pareto front. The assumptions and constraints of this design approach are provided in TABLE 3, where certain dimensions and constraints were pushed towards conservative values to enable further research and laboratory scale testing. These tolerances may be tighter for final production of the implemented isolation transformer which will result in better performing designs. The first optimized design was for a trident type 1 and the second was for a quindent type 3. The loss plots legends are for materials with tight, rectangular windings around the center posts of the core with cross sectional areas constrained by either a ribbon width of the indicated mm or a square shape for ferrite. The volume front for the trident design is also shown with respect to this geometry code.

Figure 6A:
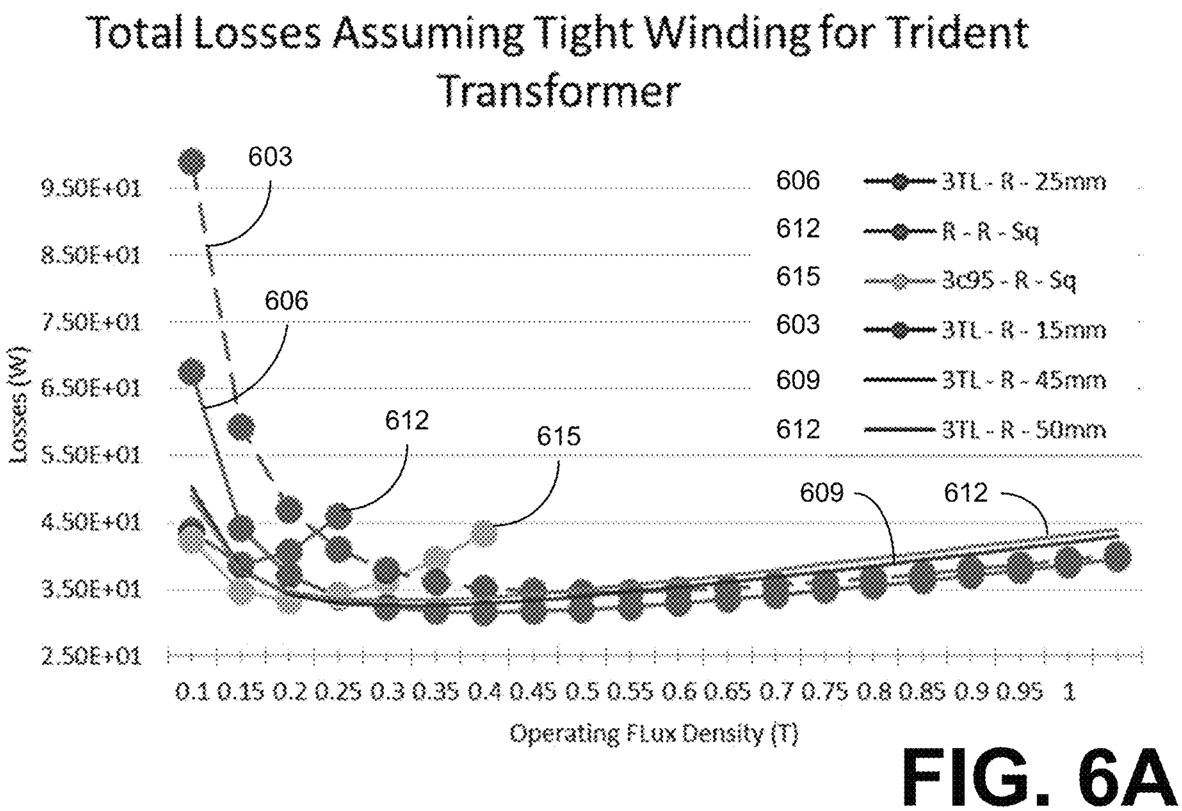
FIGS. 6A and 6B illustrate examples of total losses and core volume for various configurations of a trident type 1 transformer, in accordance with various embodiments of the present disclosure.
Figure 6B:
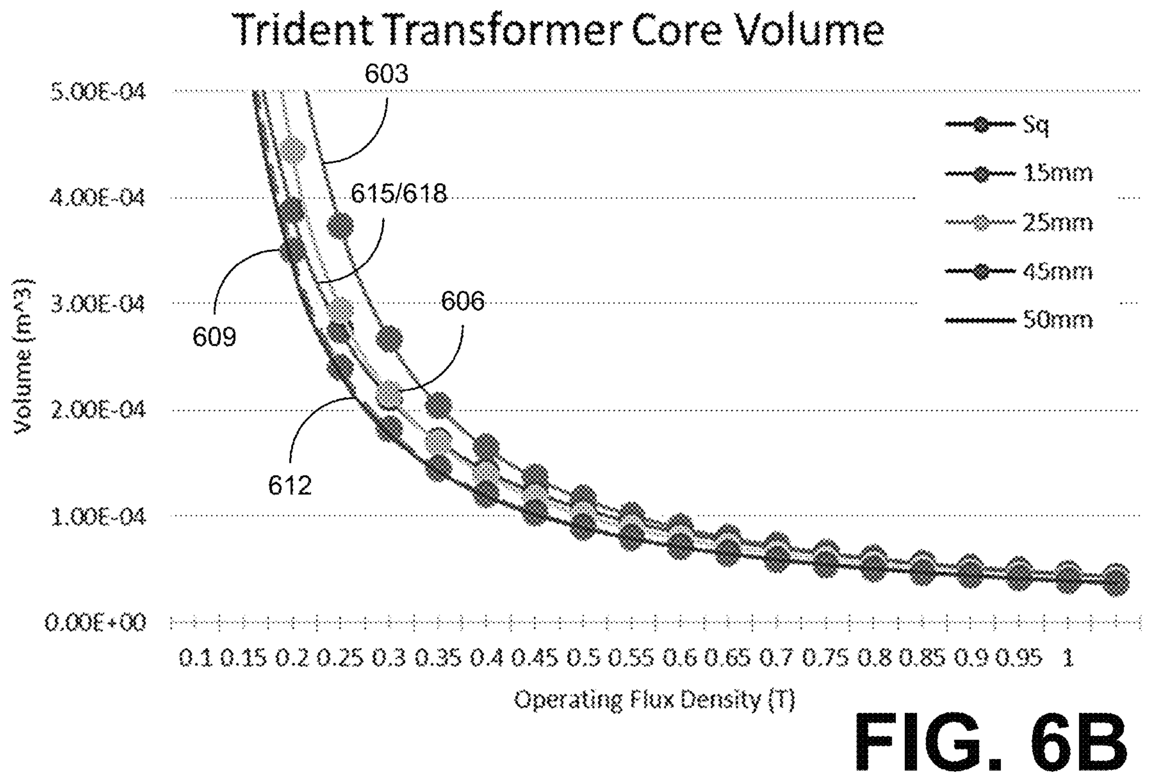
Figure 6C:
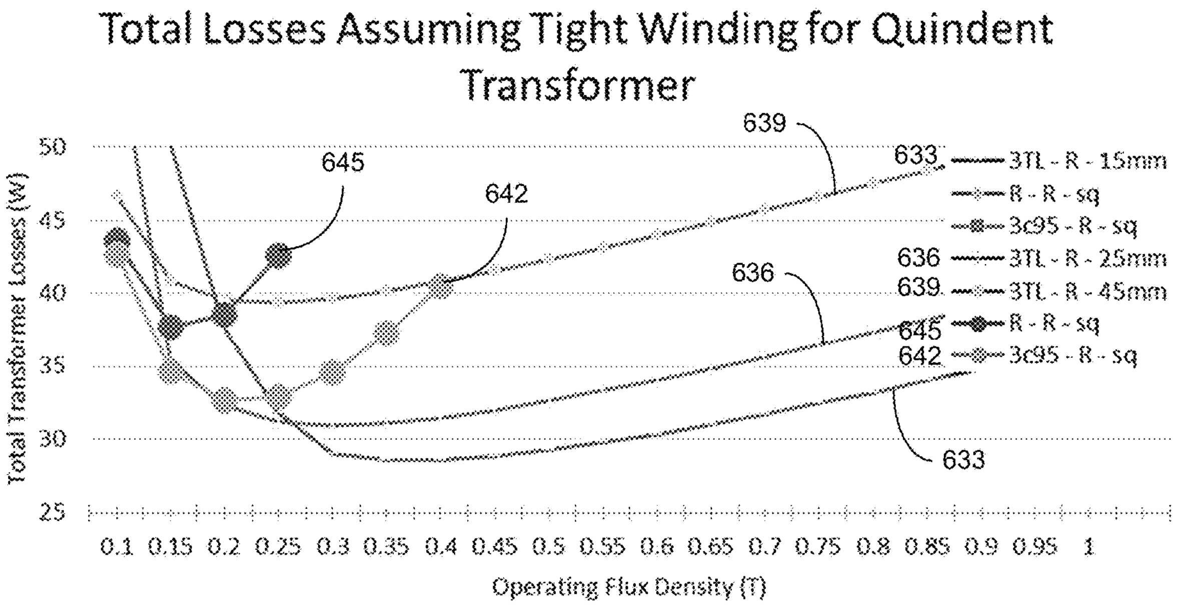
FIG. 6C illustrates examples of total losses for various configurations of a quindent type 3 transformer, in accordance with various embodiments of the present disclosure.

FIG. 6A illustrates examples of total loss for the trident type 1 design with a ribbon width of 15 mm (603), 25 mm (606), 45 mm (609) and 50 mm (612), and with ferrite square shapes (615 and 618). FIG. 6B illustrates examples of the core volume for the trident type 1 design. FIG. 6C illustrates examples of total loss for the quindent type 3 design with a ribbon width of 15 mm (633), 25 mm (636) and 45 mm (639), and with ferrite square shapes (642 and 645). It is interesting to note that the quindent transformer is highly sensitive to the ratio of the core build and ribbon thickness. This may be attributed to the squareness, or minimum perimeter, of the quindent center post being very sensitive to the core geometry.

Design Results

While typical transformer design is fundamentally a multivariable design process, the constraints of this specific converter and application significantly reduce the degrees of freedom. As such, the optimization depends on a core geometry and a tradeoff between losses and volume. These also depend on a specific geometry but also on a material and certain material geometry constraints. The sensitivity to these constraints is a significant factor in the design process and must be carefully considered for a variety of options. While there is an interesting variation of loss and volume around the solution space, many of the non-optimal designs also meet project specifications.

Cores can be ordered and fabricated to meet the presented optimal designs. In the next quarter, these transformers can be assembled and tested to compare measured and predicted values. Further, analytical expressions of both the losses and magnetic properties will be refined to further enable programmatic design and optimization.

Currently, high voltage isolation and ‘plug type action’ are the primary uses. However, these designs could be used in designs that include motion either transnational or rotational. Various aspects of the transformers are illustrated in the following images.

Referring now to FIGS. 7A-7E, shown are images of an isolation transformer implemented with a quindent type 3 design. The isolation transformer comprises a first excitation coil wound around a first core, which can include a plurality of cores (core elements or core segments). The isolation transformer also includes a second excitation coil wound about a second core and electrically separated from the first core by a highly resistive magnetic material (e.g., ferrite) or a non-conductive material (e.g., insulator paper or other insulating dielectric). For example, the first excitation coil can be a primary winding of the transformer at a first electrical potential and the second excitation coil can be a secondary winding at a second potential. Electrical connections can be provided to the first excitation coil through one end of the housing encasing the first excitation coil and electrical connections to the second excitation coil can be provided to the second excitation coil through the second core.

Figure 7A:
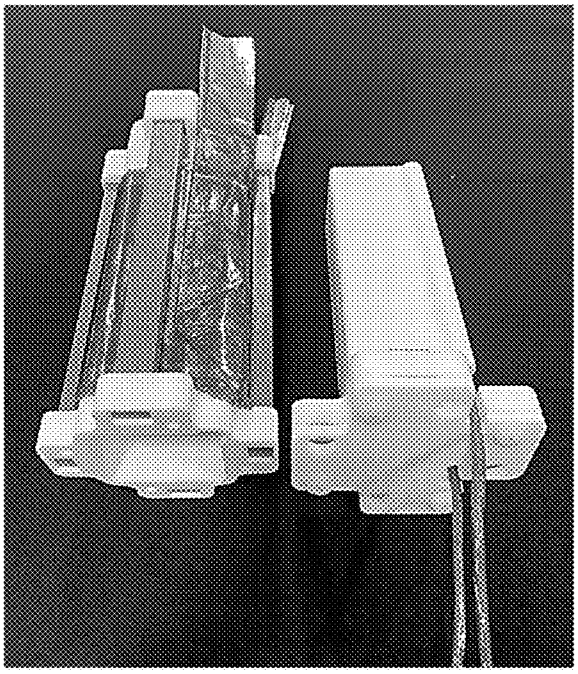
FIGS. 7A-7E are images of an isolation transformer in a quindent type 3 arrangement, in accordance with various embodiments of the present disclosure.

FIG. 7A shows the first excitation coil and first core encased in a housing on the right. The second excitation coil is shown wound about the second core on the left, with the insulated turns wound inside of the plurality of cores (core elements or core segments). Each core of the plurality of cores of the second core corresponds to one of the cores of the plurality of cores of the first core. As shown in FIG. 7A, the second excitation coil includes a central void extending through the axial length of the second excitation coil, and into which the first excitation coil can be inserted for use. The void can be formed in a non-conducting support frame or structure that supports the second excitation coil and secures the plurality of cores of the second core in position around the second excitation coil. In some embodiments, the second excitation coil can be wound around an outside of the second core.

Figure 7B:
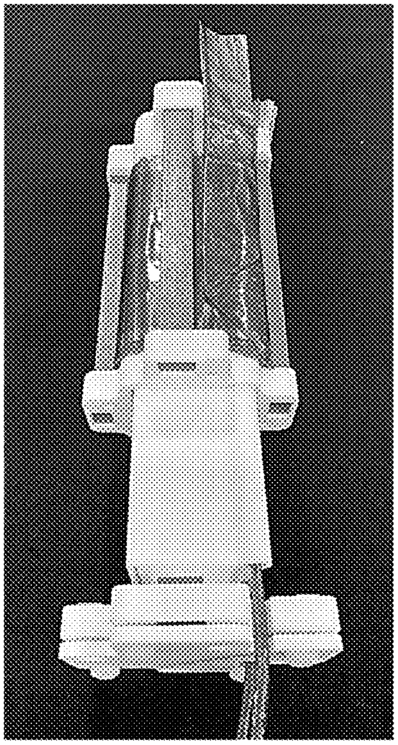
Figure 7C:
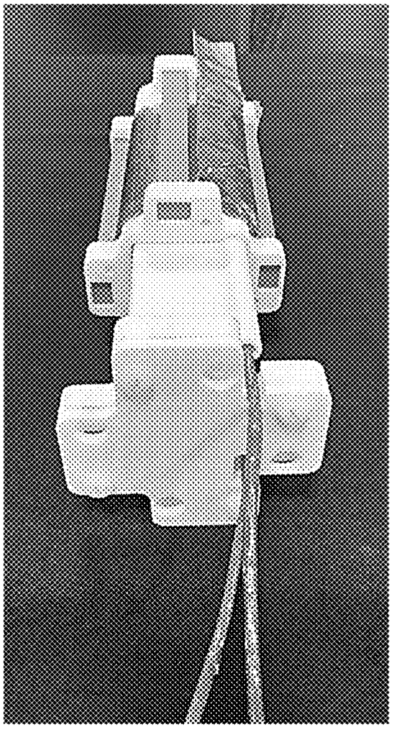

FIGS. 7B and 7C illustrate the insertion of the first excitation coil into the void within the second excitation coil. In these images, the first excitation coil is partially inserted into the void. The void and housing can be shaped to ensure fixed alignment between the excitation coils and the cores. The housing can include a guide reference (e.g., a rib extending along one corner of the housing) that matches a corresponding recess in the support frame or structure to ensure proper orientation of the first excitation coil and core with the second excitation coil and core. Full insertion of the housing into the void will align the ends of the corresponding cores of the first and second cores to provide continuous magnetic paths about the excitation coils as illustrated in FIGS. 1A-1B, 3A-3D, 4A-4D and 5A-5D. The housing material may be any materials of appropriate mechanical properties. That is, the housing should be rigid enough to maintain the prescribed alignment and survive multiple plug actions. These properties should persist despite elevated temperatures due to the electrical losses generated by the plug. Careful tuning of the various housing material selection and dimension can ensure appropriate electric field levels with various dielectric materials while maintaining desired parasitic capacitance levels.

In the quindent arrangements, the first core comprises four cores arranged with a first section extending through the first excitation coil. In this arrangement, the first section of the four cores are substantially parallel to each other. FIGS. 2C-2F illustrate examples of the arrangement of the four cores in the center of the first excitation coil and about a longitudinal axis of the first excitation coil wound about the first sections of the first core. A first end of the first section is coupled to a second section that extends substantially perpendicular to the first section as illustrated in FIGS. 1A-1B, 3A-3D, 4A-4D and 5A-5D. A second end of the first sections of the four cores can extend beyond the end of the first excitation coil and through the housing to provide access for alignment with corresponding cores of the second core. With the first core in the quindent arrangement, the second sections of the four cores extend radially outward from a proximal end coupled to the first section to a distal end.

The four cores of the first core can be positioned as shown in FIGS. 2C-2F so that the second sections extend in different radial directions that are substantially perpendicular to the adjacent second sections. The four cores can have a rectangular cross-section with a length and a width shorter than the length. As shown in FIGS. 2C-2F, the four cores can be arranged with the longer sides adjacent to each other, with a longer side and a shorter side adjacent to each other or a combination of both. The distal end of the second sections can be shaped to bend or curve in a direction substantially parallel to the first section. As shown in FIGS. 1A-1B, 3A-3D, 4A-4D and 5A-5D, this configuration can facilitate alignment of the distal end of the second section with the corresponding core of the second core.

Figure 7D:
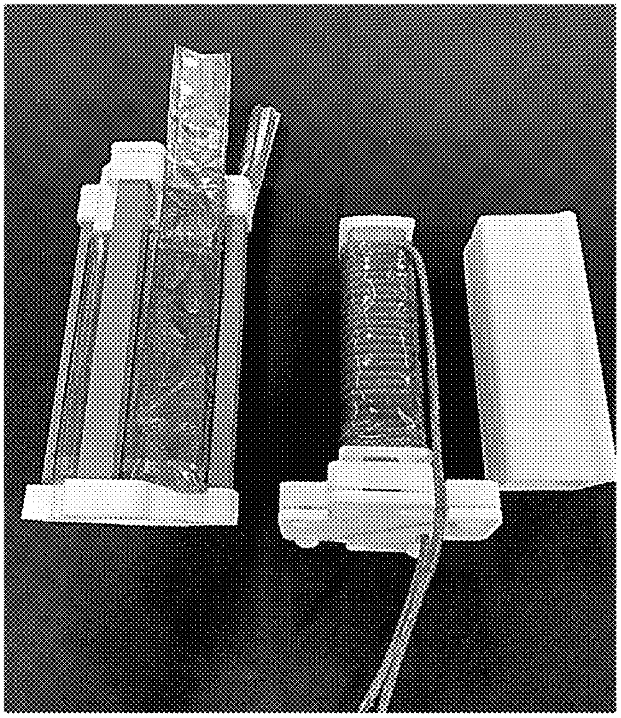
Figure 7E:
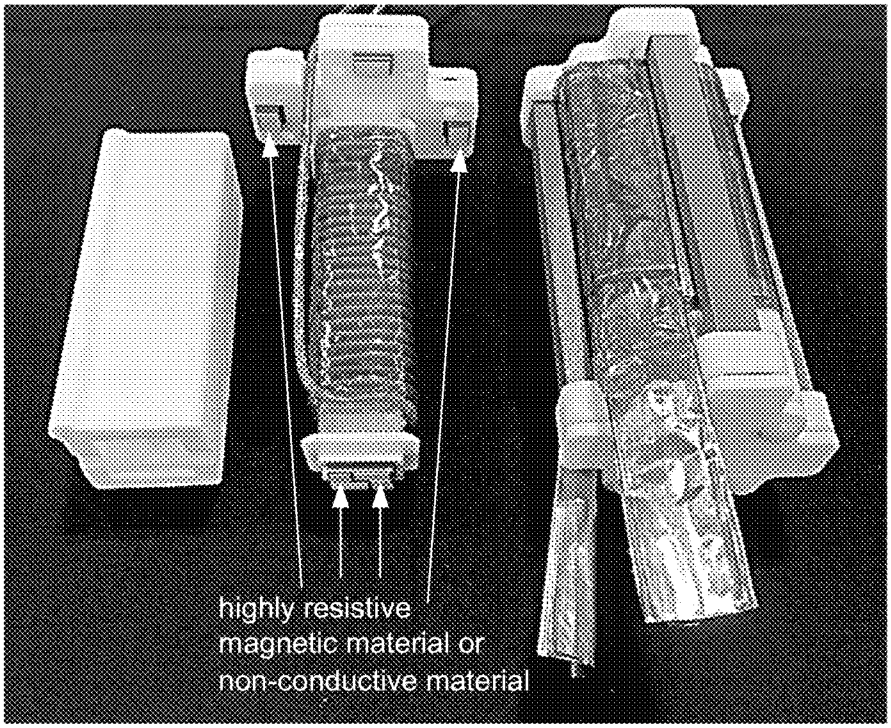

FIGS. 7D and 7E show the housing removed from around the first excitation coil. In this embodiment, the first excitation coil includes a plurality of turns around the plurality of cores (core elements or core segments) of the first core in a single layer. In other implementations, multiple layers of winding turns can be used to achieve the desired turns ratio between the excitation coils. Electrical connections to the first excitation coil are provided adjacent to the first end of the first sections of the four cores to facilitate insertion of the first excitation coil into the central void of the second excitation coil. The electrical connections to the second excitation coil extend from the opposite end of the isolation transformer as can be seen in FIGS. 7D and 7E. The second end of the first section of the four cores and the distal end of the second section of the four cores can be seen in FIG. 7E. The housing can include an opening at one end to allow access to the second ends of the first sections.

As illustrated in FIGS. 3A-3D, 4A-4D and 5A-5D, the second core also includes four cores having a first section that extends substantially parallel to the central void of the second excitation coil and, when the first excitation coil is inserted, substantially parallel to the longitudinal axis of the first excitation coil and the first segments of the four cores of the first core. The first sections can be seen extending outside the second excitation coil in FIGS. 7A-7E. A first end of the first section is coupled to a second section that extends substantially perpendicular to the first section as illustrated in FIGS. 1A-1B, 3A-3D, 4A-4D and 5A-5D. A second end of the first sections of the four cores can extend through the support frame or structure as shown in FIGS. 7A-7C to provide access for alignment with corresponding cores of the first core. With the second core in the quindent arrangement, the second sections of the four cores extend inward from a proximal end coupled to the first section to a distal end. In the embodiment of FIGS. 7A-7E, the second sections pass through the support frame or structure to a distal end of the central void. The distal end of the second sections can be shaped to bend or curve in a direction substantially parallel to the first section. As shown in FIGS. 1A-1B, 3A-3D, 4A-4D and 5A-5D, this configuration can facilitate alignment of the distal end of the second section with the corresponding core of the first core.

Referring next to FIGS. 8A-8D, shown are images of an isolation transformer implemented with a trident type 1 design. The isolation transformer comprises a first excitation coil wound around a first core, which can include a plurality of cores (core elements or core segments). The isolation transformer also includes a second excitation coil wound about a second core and electrically separated from the first core by a highly resistive magnetic material (e.g., ferrite) or a non-conductive material (e.g., insulator paper or other insulating dielectric). For example, the first excitation coil can be a primary winding of the transformer at a first electrical potential and the second excitation coil can be a secondary winding at a second potential. Electrical connections can be provided to the first excitation coil through one end of the housing encasing the first excitation coil and electrical connections to the second excitation coil can be provided to the second excitation coil through the second core.

Figure 8A:
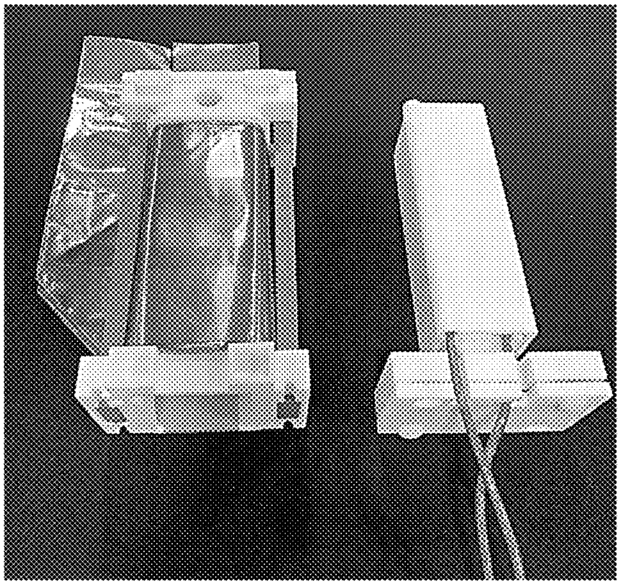
FIGS. 8A-8D are images of an isolation transformer in a trident type 1 arrangement, in accordance with various embodiments of the present disclosure.
Figure 8B:
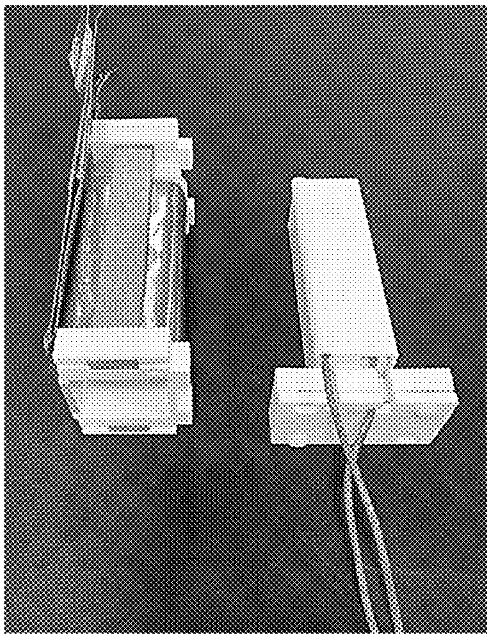

FIGS. 8A and 8B show the first excitation coil and first core encased in a housing on the right. The second excitation coil is shown wound about the second core on the left, with the insulated turns wound inside of the plurality of cores (core elements or core segments). Each core of the plurality of cores of the second core corresponds to one of the cores of the plurality of cores of the first core. As shown in FIGS. 8A and 8B, the second excitation coil includes a central void extending through the axial length of the second excitation coil, and into which the first excitation coil can be inserted for use. The void can be formed in a non-conducting support frame or structure that supports the second excitation coil and secures the plurality of cores of the second core in position around the second excitation coil. In some embodiments, the second excitation coil can be wound around an outside of the second core.

The first excitation coil can be inserted into the void within the second excitation coil in a similar fashion as shown in FIGS. 7B and 7C. The void and housing can be shaped to ensure fixed alignment between the excitation coils and the cores. The housing can include a guide reference (e.g., a rib extending along one corner of the housing) that matches a corresponding recess in the support frame or structure to ensure proper orientation of the first excitation coil and core with the second excitation coil and core. Full insertion of the housing into the void will align the ends of the corresponding cores of the first and second cores to provide continuous magnetic paths about the excitation coils as illustrated in FIGS. 1A and 1B.

Figure 2B:
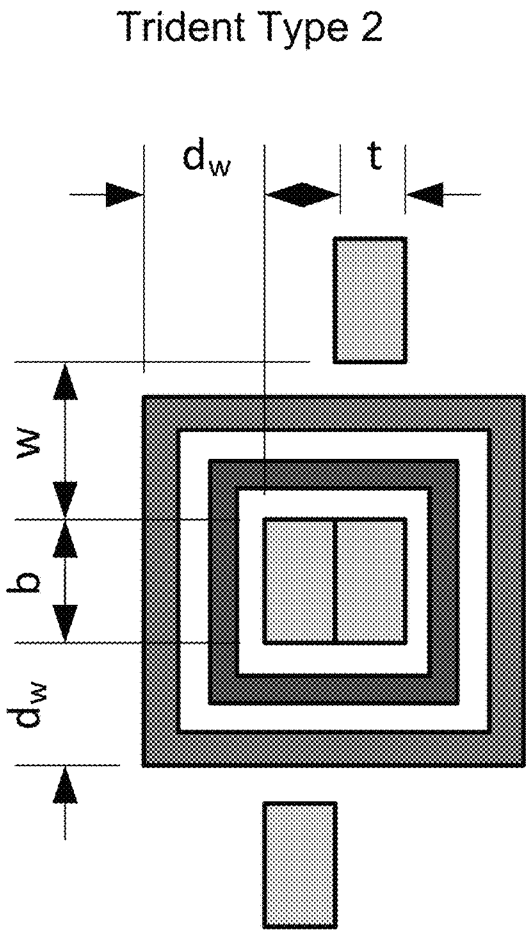
Figure 2C:
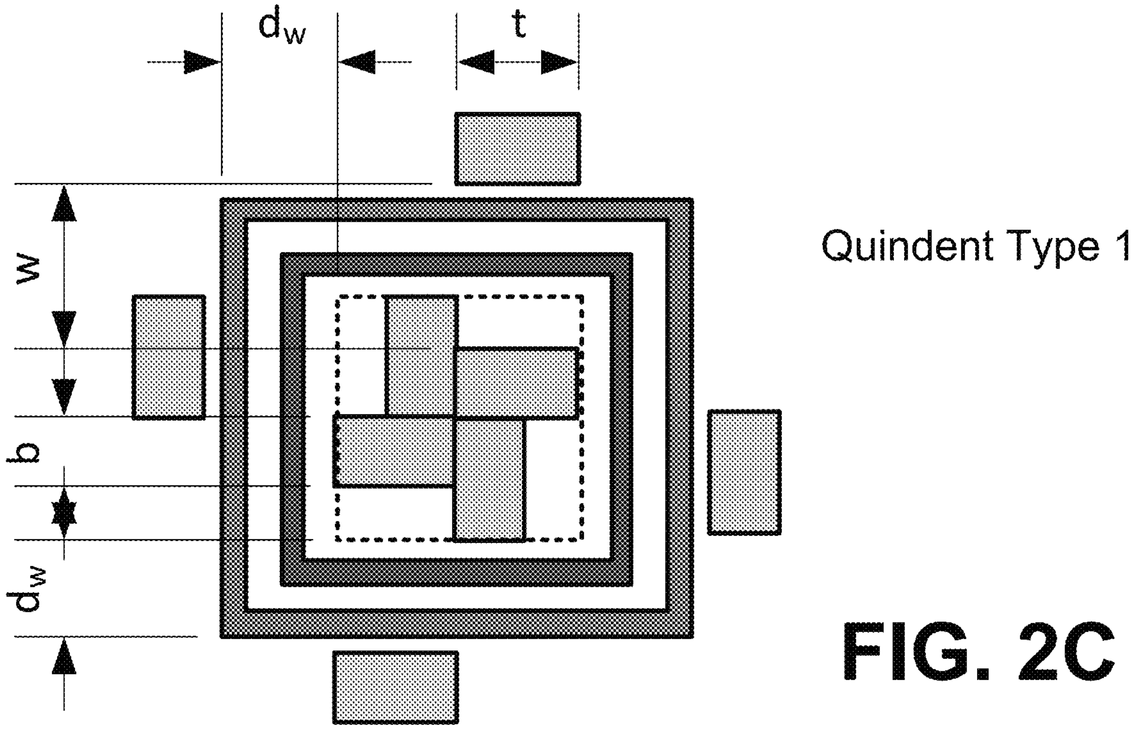
Figure 2D:
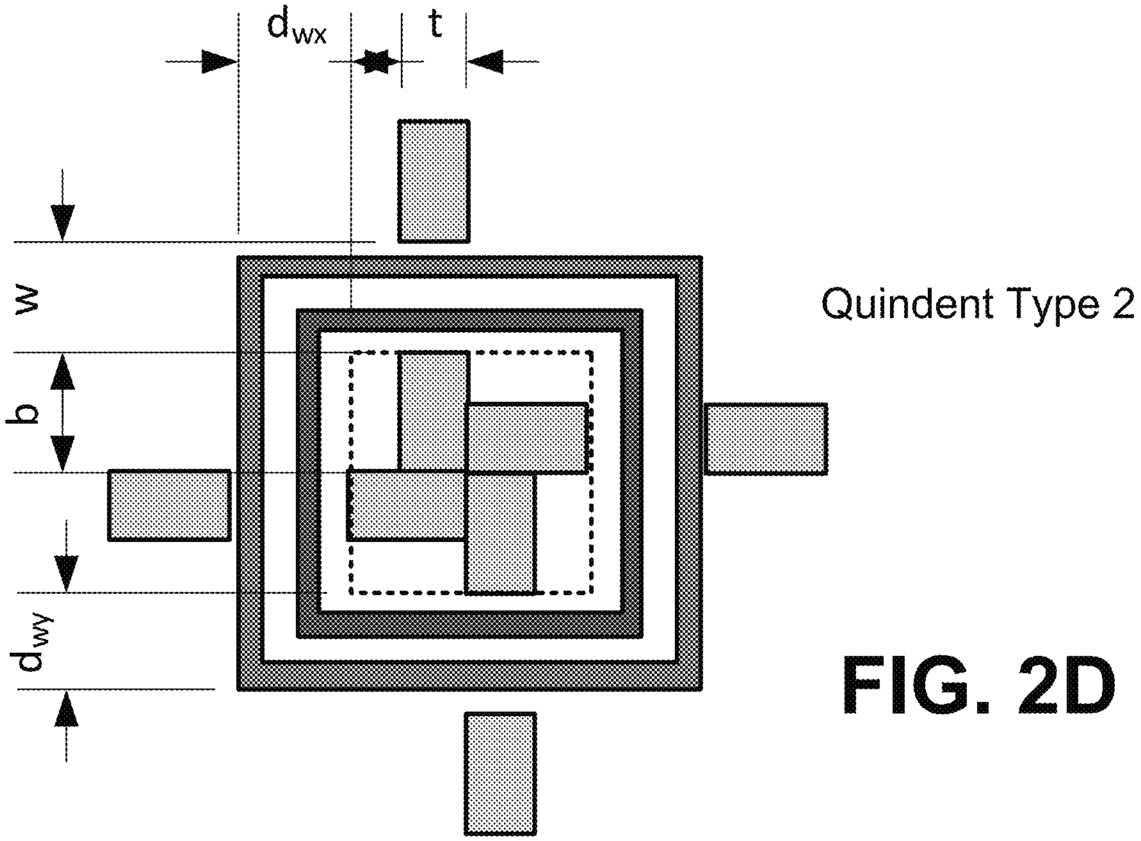
Figure 2E:
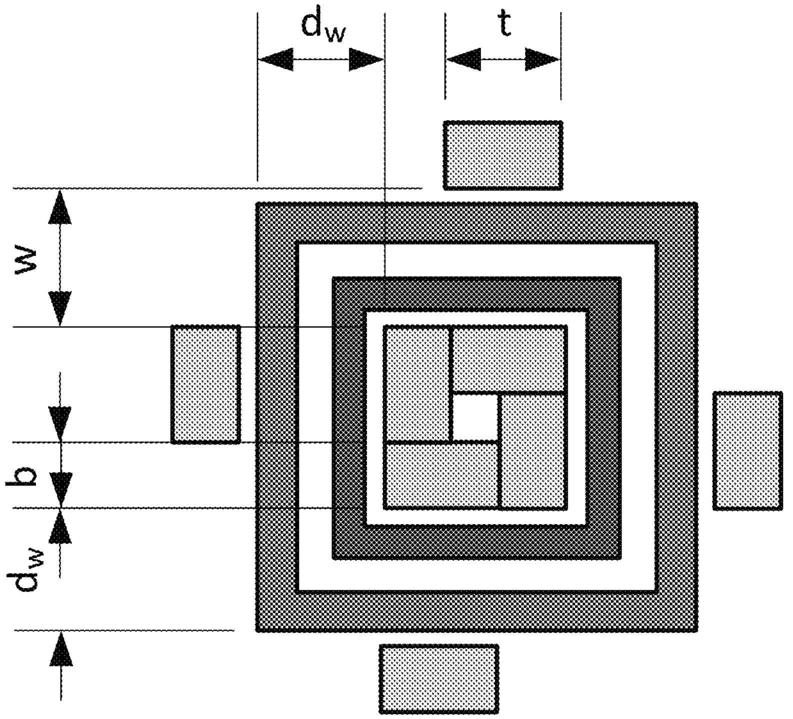
Figure 2F:
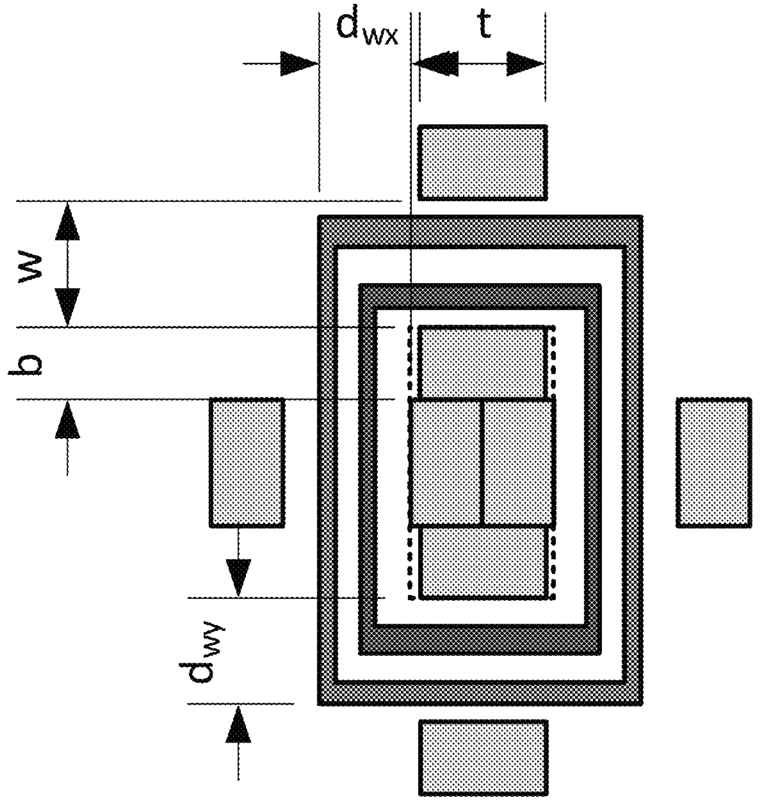

In the trident arrangements, the first core comprises two cores arranged with a first section extending through the first excitation coil. In this arrangement, the first section of the two cores are substantially parallel to each other. FIGS. 2A and 2B illustrate examples of the arrangement of the two cores in the center of the first excitation coil and about a longitudinal axis of the first excitation coil wound about the first sections of the first core. A first end of the first section is coupled to a second section that extends substantially perpendicular to the first section as illustrated in FIGS. 1A and 1B. A second end of the first sections of the two cores can extend beyond the end of the first excitation coil and through the housing to provide access for alignment with corresponding cores of the second core. With the first core in the quindent arrangement, the second sections of the two cores extend radially outward from a proximal end coupled to the first section to a distal end.

The two cores of the first core can be positioned as shown in FIGS. 2A and 2B so that the second sections extend in opposite radial directions that are substantially perpendicular to the adjacent second sections. The two cores can have a rectangular cross-section with a length and a width shorter than the length. As shown in FIGS. 2A and 2B, the two cores can be arranged with the longer sides adjacent to each other. The distal end of the second sections can be shaped to bend or curve in a direction substantially parallel to the first section. As shown in FIGS. 1A and 1B, this configuration can facilitate alignment of the distal end of the second section with the corresponding core of the second core.

Figure 8C:
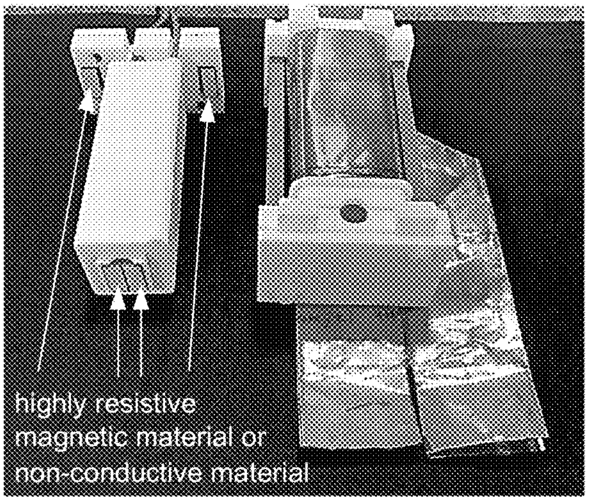
Figure 8D:
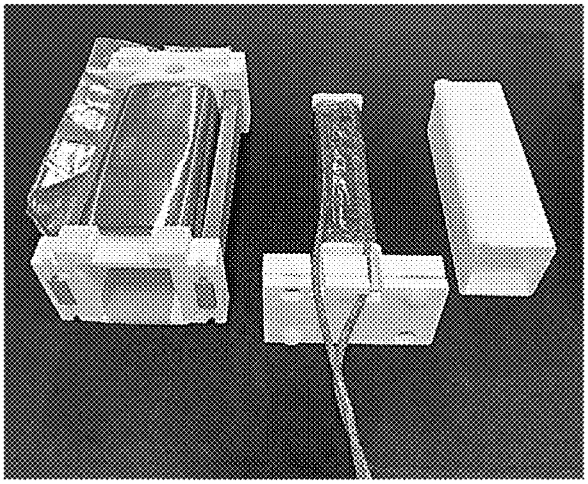

FIGS. 8C and 8D show the housing installed and removed from around the first excitation coil, respectively. In this embodiment, the first excitation coil includes a plurality of turns around the plurality of cores (core elements or core segments) of the first core in a single layer. In other implementations, multiple layers of winding turns can be used to achieve the desired turns ratio between the excitation coils. Electrical connections to the first excitation coil are provided adjacent to the first end of the first sections of the two cores to facilitate insertion of the first excitation coil into the central void of the second excitation coil. The electrical connections to the second excitation coil extend from the opposite end of the isolation transformer as can be seen in FIGS. 8B and 8D. The second end of the first section of the two cores and the distal end of the second section of the two cores can be seen in FIG. 8C. The housing can include an opening at one end to allow access to the second ends of the first sections as shown.

As illustrated in FIGS. 1A and 1B, the second core also includes two cores having a first section that extends substantially parallel to the central void of the second excitation coil and, when the first excitation coil is inserted, substantially parallel to the longitudinal axis of the first excitation coil and the first segments of the two cores of the first core. The first sections can be seen extending outside the second excitation coil in FIGS. 8A-8D. A first end of the first section is coupled to a second section that extends substantially perpendicular to the first section as illustrated in FIGS. 1A and 1B. A second end of the first sections of the two cores can extend through the support frame or structure as shown in FIGS. 8A, 8B and 8D to provide access for alignment with corresponding cores of the first core. With the second core in the trident arrangement, the second sections of the two cores extend inward from a proximal end coupled to the first section to a distal end. In the embodiment of FIGS. 8A-8D, the second sections pass through the support frame or structure to a distal end of the central void. The distal end of the second sections can be shaped to bend or curve in a direction substantially parallel to the first section. As shown in FIGS. 1A and 1B, this configuration can facilitate alignment of the distal end of the second section with the corresponding core of the first core.

An example of the application of the disclosed isolation transformer is presented in "Analysis and Design Considerations of a Contactless Magnetic Plug for Charging Electric Vehicles Directly from the Medium Voltage DC Grid with Arc Flash Mitigation" by R. B. Beddingfield et al. (IEEE Journal of Emerging and Selected Topics in Industrial Electronics, 3 Jun. 2020), which is hereby incorporated by reference in its entirety. The paper discloses a contactless magnetic plug solution for electric vehicle charging that uses an isolation transformer with a quindent type 3 core arrangement. A low voltage hardware prototype was constructed and tested. This prototype was designed to help study the high voltage loss models but operate at ⅛ voltage and power. The low voltage is a 1000 V to 50 V transformer that uses 20 turns on the primary and one 7 layer foil turn on the secondary. The difference between the transformers is the number of turns and the winding gap, $g_w$. The magnetic core and configuration were the same as the core specified for the high voltage design. Table 5 illustrates the build parameters of the protogype.

TABLE 5

| Parameter | Symbol | Value |
|---|---|---|
| Primary turns | $N_p$ | 20 |
| Secondary turns | $N_s$ | 1 |
| Primary type | Pri | 6 Awg Cu Litz |
| Secondary type | Sec | Layered Al foil |
| Primary layers | $n_p$ | 1 |
| Secondary layers | $n_s$ | 7 |
| Secondary Height | $h_s$ | 6 in |
| Secondary layer thickness | $w_s$ | 5 mil |
| Core gap | g | 0.5 mm |
| Winding gap | $g_w$ | 11.25 mm |
| Core material | Mtl | ft3TL |
| Core width | w | 25 mm and 15 mm |
| Core build | b | 11 mm |
| Window height | $h_w$ | 175 mm, cut at 170/5 mm |
| Window width | $l_w$ | 25 mm |

The low voltage design uses the same core design and is excited to the same volt-seconds per turn (flux density) as the proposed high voltage. This means that the low voltage prototype magnetizing losses are the same as the high voltage design. In order to understand the conduction losses, the isolation transformer was operated up to the rated output current. The windings were designed with added resistance to match the FEA predicted winding resistance and were constructed in similar methods. A comparison of high voltage design FEA predicted and measured low voltage parameters is shown in Table 6. One parameter that could not be matched was the magnetizing inductance. Maintaining the same core and gap but with significantly fewer turns reduces this magnetizing inductance, resulting in significantly higher magnetization current.

TABLE 6

| Value | FEA Predicted | Low Voltage Measured |
|---|---|---|
| $R_p$ | 1 Ω | 1.2 Ω |
| $R_s$ | 900 μΩ | 850 μΩ |
| $L_m$ | 4.6 mH | 0.37 mH |
| $L_l$ | 96.4 μ H | 113 μ H |
| $g_w$ | 4 mm | 11.25 mm |
| $K_{Coupling}$ | 0.98 | 0.77 |

Measured losses. The measured total losses, recorded with a Yokogawa WT3000, for various resonant compensation percentages. A higher frequency, 50 kHz, excitation was also tested in the low voltage prototype to explore what potential future switches could enable. The 30 kHz, non-resonant excitation was halted early due to poor voltage regulation. IGSE method was used to estimate the core loss considering the semi-resonant excitation. While significant magnetizing current contributes to losses in the low voltage prototype, the total current levels of the primary and secondary windings at 20 kW are near the rated current levels of the 150 kW design. With similar winding resistances, these losses are representative of total losses in the medium voltage contactless magnetic plug. With the presented breakdown in losses, it is expected that the high voltage HPMFT design will operate near 99.5% efficiency. However, dielectric losses are not currently included which will lower this predicted efficiency.

Safe Energized Disconnection. The magnetic plug configuration of the isolation transformer enables a safe disconnect while the system is energized. Also known as a 'hot swapping', the load plug may connect or disconnect without turning off, down, or rebooting the plug source. The physical action of opening or closing the plug (by removing or inserting the first excitation coil and core from or into the central void of the second excitation coil) results in change in the magnetic field in the core. This causes a dB/dt which results in a change of the voltage on the load. This is different from traditional plugs where electrical contacts force a dI/dt. Large dI/dt will result in excessive voltage swings that will cause electrical arcing. By controlling the coupling through the magnetic field and magnetic coupling, this plug configuration of the isolation transformer eliminates the arc risk.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The term "substantially" is meant to permit deviations from the descriptive term that don't negatively impact the intended purpose. Descriptive terms are implicitly understood to be modified by the word substantially, even if the term is not explicitly modified by the word substantially.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. An isolation transformer, comprising:

a first excitation coil and a second excitation coil, the first excitation coil wound around a first core comprising at least one core element, each of the at least one core element of the first core including:

a first section extending axially through the first excitation coil from a first end to a second end, and a second section extending from the first end of the first section, the second section substantially perpendicular to the first section, the first excitation coil and the first section of each of the at least one core element of the first core encased in a housing configured for removable insertion into a central void of the second excitation coil, the first excitation coil and the first section of each of the at least one core element of the first core encased in the housing axially insertable and removable from the central void of the second excitation coil while energized; and a second core of the second excitation coil, the second core comprising at least one corresponding core element, each of the at least one corresponding core element of the second core including a first section and a second section extending from a first end of the first section of that corresponding core element, the second section of each of the at least one corresponding core element substantially perpendicular to the first section of that corresponding core element, the second excitation coil wound around the central void and adjacent to the second core, where a side surface at a distal end of the second section of each of the at least one corresponding core element of the second core aligns with an end surface at a second end of the first section of a corresponding one of the at least one core element of the first core, and an end surface at a second end of the first section of each of the at least one corresponding core element of the second core aligns with a side surface at a distal end of the second section of the corresponding one of the at least one core element of the first core when the first excitation coil and the first section of each of the at least one core element of the first core encased in the housing are inserted into the central void of the second excitation coil, the second core electrically separated from the first core by a high resistivity magnetic material or a non-conductive material.

2. The isolation transformer of claim 1, wherein the high resistivity magnetic material comprises ferrite.

3. The isolation transformer of claim 1, wherein the non-conductive material comprises an insulator.

4. The isolation transformer of claim 1, wherein the first and second excitation coils are referenced to different electrical potentials.

5. The isolation transformer of claim 1, wherein the at least one core element of the first core comprises a plurality of core elements, each of the plurality of core elements comprising:

the first section extending through the first excitation coil from the first end, the first section substantially parallel to the first section of the other core elements of the first core, and the second section extending from the first end of the first section, the second section substantially perpendicular to the first section.

6. The isolation transformer of claim 5, wherein the at least one corresponding core element of the second core comprises a plurality of corresponding core elements, each of the plurality of corresponding core elements comprising:

the first section substantially parallel to the first section of the other corresponding core elements of the second core, and the second section extending from the first end of the first section, the second section substantially perpendicular to the first section, where the side surface at the distal end of the second section of each corresponding core element of the plurality of corresponding core elements aligns with the end surface at the second end of the first section of the corresponding one of the plurality of core elements of the first core, and the end surface at the second end of the first section of each corresponding core element of the plurality of corresponding core elements aligns with the side surface at the distal end of the second section of the corresponding one of the plurality of core elements of the first core when the first excitation coil and the first sections of the plurality of core elements of the first core encased in the housing are inserted into the central void of the second excitation coil.

7. The isolation transformer of claim 1, wherein the second excitation coil is between the first excitation coil and the first section of each of the at least one corresponding core element of the second core.

8. The isolation transformer of claim 1, wherein the first core comprises a plurality of core elements distributed about a longitudinal axis of the first excitation coil, where each of the plurality of core elements comprises:

the first section extending through the first excitation coil from the first end, the first section substantially parallel to the first section of the other core elements of the first core, and the second section extending from the first end of the first section, where the second section of each of the plurality of core elements extends radially outward from and substantially perpendicular to the first section.

9. The isolation transformer of claim 8, wherein the plurality of core elements comprises a pair of core elements, the second section of each of the pair of core elements extending opposite each other.

10. The isolation transformer of claim 9, wherein each of the pair of core elements have a rectangular cross-section comprising a length and a width shorter than the length.

11. The isolation transformer of claim 10, wherein a side of the first section of one core element of the pair of core elements is aligned with a side of the first section of the other core element of the pair of core elements.

12. The isolation transformer of claim 9, wherein the plurality of core elements comprises a second pair of core elements, the second section of each of the second pair of core elements extending opposite each other and substantially perpendicular to the second sections of the other pair of core elements.

13. The isolation transformer of claim 8, wherein the second core comprises a plurality of corresponding core elements distributed about the first excitation coil, where each of the plurality of corresponding core elements comprises:

the first section substantially parallel to the first section of the other core elements of the second core, and the second section extending from the first end of the first section and substantially perpendicular to the first section, where the distal end of the second section of each of the plurality of corresponding core elements aligns with the second end of the first section of the corresponding one of the plurality of core elements of the first core, and the second end of the first section of each of the plurality of corresponding core elements aligns with the distal end of the second section of the corresponding one of the plurality of core elements of the first core when the first excitation coil and the first sections of the first core elements are inserted into the central void of the second excitation coil.

14. The isolation transformer of claim 1, wherein the first excitation coil and the first core are encased in the housing.

15. The isolation transformer of claim 14, wherein the central void of the second excitation coil is configured to receive the housing containing the first excitation coil and the first section of each of the at least one core element of the first core, the housing configured to align the first core with the second core when inserted into the central void, the housing providing electrical isolation between the first and second excitation coils.

16. The isolation transformer of claim 15, wherein the first core comprises a plurality of core elements, each of the plurality of core elements comprising the first section extending through the first excitation winding and the second section extending from the first end of the first section, and the second core comprises a plurality of corresponding core elements, each of the plurality of corresponding core elements comprising the first section and the second section extending from the first end of the first section, wherein ends of each of the plurality of core elements of the first core align with ends of one of the plurality of corresponding core elements of the second core when the housing is inserted into the central void of the second excitation coil.

17. The isolation transformer of claim 16, wherein the plurality of core elements of the first core and the plurality of corresponding core elements of the second core are arranged in a trident geometry or a quindent geometry.

* * * * *